United States Patent

[11] 3,577,190

[72] Inventors John Cocke
Menlo Park;
Philip S. Dauber; Herbert Schorr; Edward H. Sussenguth, Los Altos, Calif.
[21] Appl. No. 740,360
[22] Filed June 26, 1968
[45] Patented May 4, 1971
[73] Assignee International Business Machines Corporation
Armonk, N.Y.

[54] APPARATUS IN A DIGITAL COMPUTER FOR ALLOWING THE SKIPPING OF PREDETERMINED INSTRUCTIONS IN A SEQUENCE OF INSTRUCTIONS, IN RESPONSE TO THE OCCURRENCE OF CERTAIN CONDITIONS
9 Claims, 24 Drawing Figs.

[52] U.S. Cl. 340/172.5
[51] Int. Cl. G06f 9/10
[50] Field of Search 340/172.5

[56] References Cited
UNITED STATES PATENTS

| | | | |
|---|---|---|---|
| 3,416,138 | 12/1968 | Brass | 340/172.5 |
| 3,418,638 | 12/1968 | Anderson et al. | 340/172.5 |
| 3,401,376 | 9/1968 | Barnes et al. | 340/172.5 |

*Primary Examiner*—Paul J. Henon
*Assistant Examiner*—R. F. Chapuran
*Attorneys*—Hanifin and Jancin and Peter R. Leal

ABSTRACT: Apparatus in a digital computer for allowing the skipping of predetermined instructions in a sequence of instructions is disclosed. Means are provided for detecting a specific type of instruction in a sequence of instructions. This specific type of instruction is referred to as a skip instruction and indicates that upon the occurrence of a specified machine condition, predetermined subsequent instructions in said sequence are to be skipped. Further means are provided to determine the occurrence of the specified machine condition, and to emit an output signal indicative of the occurrence. Means responsive to the output signal effect the skipping of the predetermined instructions.

*INVENTORS.*
JOHN COCKE
PHILIP S. DAUBER
HERBERT SCHORR
EDWARD H. SUSSENGUTH
BY Peter R. Leal
AGENT

OP 1
SKIP 1
OP 2
*OP 3
*OP 4
*OP 5
OP 6
SKIP 2
OP 7
*OP 8
OP 9
OP 10
OP 11
OP 12

FIG.10A

ROW 0 SKIP 1
ROW 1 OP 2
ROW 2 *OP 3
ROW 3 *OP 4
ROW 4 *OP 5
ROW 5 OP 6
ROW 6 VACANT

FIG.10B

ROW 0 OP 2
ROW 1 *OP 3 N-0
ROW 2 *OP 4 N-0
ROW 3 *OP 5 N-0
ROW 4 OP 6
ROW 5 SKIP 2
ROW 6 OP 7

FIG.10C

ROW 0 OP 6
ROW 1 SKIP 2
ROW 2 OP 7
ROW 3 *OP 8
ROW 4 OP 9
ROW 5 OP 10
ROW 6 OP 11

FIG.10D

ROW 0 SKIP 2
ROW 1 OP 7
ROW 2 *OP 8
ROW 3 OP 9
ROW 4 OP 10
ROW 5 OP 11
ROW 6 OP 12

FIG.10E

| CYCLE → / ROW ↓ | 1 | 2 | 3 | 4 | 5 | 6 | 7 | 8 | 9 | 10 | 11 | 12 |
|---|---|---|---|---|---|---|---|---|---|---|---|---|
| 6 | – | 1 | S1 | 2 | *3 | *4 | *5 | 6 | S2 | 7 | 11 | 12 |
| 5 | – | – | 1 | S1 | 2 | *3 | *4 | *5 | 6 | S2 | 10 | 11 |
| 4 | – | – | – | 1 | S1 | 2 | *3 | *4 | *5 | 6 | 9 | 10 |
| 3 | – | – | – | – | 1 | S1 | 2 | *3 | *4 | *5 | *8 | 9 |
| 2 | – | – | – | – | – | 1 | S1 | 2 | *3 | *4 | 7 | *8 |
| 1 | – | – | – | – | – | – | 1 | S1 | 2 | *3 | S2 | 7 |
| 0 | – | – | – | – | – | – | – | 1 | S1 | 2 | 6 | S2 |

FIG.10F

OP 1
SKIP 1
* OP 2
* OP 3
OP 4
SKIP 2
OP 5
OP 6
OP 7
* OP 8
OP 9
OP 10

FIG. 11A

ROW 0 SKIP 1
ROW 1 * OP 2
ROW 2 * OP 3
ROW 3 OP 4
ROW 4 SKIP 2
ROW 5 OP 5
ROW 6 OP 6

FIG. 11B

ROW 0 * OP 2
ROW 1 * OP 3 N-0
ROW 2 OP 4
ROW 3 SKIP 2
ROW 4 OP 5
ROW 5 OP 6
ROW 6 OP 7

FIG. 11C

ROW 0 OP 4
ROW 1 SKIP 2
ROW 2 OP 5
ROW 3 OP 6
ROW 4 OP 7
ROW 5 * OP 8
ROW 6 OP 9

FIG. 11D

| ROW | INITIALLY | CYCLE 1 | CYCLE 2 | CYCLE 3 |
|---|---|---|---|---|
| 6 | 5 | 6 | 7 | 9 |
| 5 | S2 | 5 | 6 | *8 |
| 4 | 4 | S2 | 5 | 7 |
| 3 | *3 | 4 | S2 | 6 |
| 2 | *2 | *3 | 4 | 5 |
| 1 | S1 | *2 | *3 | S2 |
| 0 | 1 | S1 | *2 | 4 |

FIG. 11E

SKIP 1
* OP 1
* OP 2
* OP 3
* OP 4
* OP 5
* OP 6
OP 7

FIG. 12A

| ROW | INITIALLY | CYCLE 1 | CYCLE 2 |
|---|---|---|---|
| 6 | *6 | 7 | 11 |
| 5 | *5 | *6 | 10 |
| 4 | *4 | *5 | 9 |
| 3 | *3 | *4 NO | 8 |
| 2 | *2 | *3 NO | 7 |
| 1 | *1 | *2 NO | *6 |
| 0 | S1 | *1 | *5 |

FIG. 12B

APPARATUS IN A DIGITAL COMPUTER FOR ALLOWING THE SKIPPING OF PREDETERMINED INSTRUCTIONS IN A SEQUENCE OF INSTRUCTIONS, IN RESPONSE TO THE OCCURRENCE OF CERTAIN CONDITIONS

BACKGROUND OF INVENTION

1. Field of the Invention

This invention relates to apparatus for instruction processing in an electronic digital computer. More particularly, this invention relates to apparatus having the ability to skip, or inhibit, the processing of a sequence or certain ones of a sequence of instructions in an electronic digital computer.

2. Description of Prior Art

The complexities of modern life have generated the need for the electronic processing of vast amounts of data. This need has triggered the development of large scale, fast electronic digital computers which process these vast amounts of data by processing sequences of instructions within the computer. To meet the ever increasing needs of data processing, speed in processing instructions is of the essence.

When processing a sequence of instructions, it is often necessary for the apparatus of the digital computer to skip, or inhibit the processing of, one or more instructions in the sequence. That is to say, program instructions may be such that is is necessary for the apparatus within the digital computer, after processing a first instruction, to skip to a subsequent instruction other than the instruction which follows said first instruction sequentially. This has been accomplished in the past by the use of apparatus for performing a branch instruction from said first instruction to said subsequent instruction. However, the use of the branch instruction, in general, severely degrades the performance of a digital computer. That is, when the computer reaches a branch mode instruction, the central processing unit must wait while the next instruction in the branch mode is received from storage. Hence, time is lost while waiting for needed instructions.

In addition to being wasteful of processing time, prior art apparatus utilizing a branch instruction suffers from the drawback of poor code optimization. Large scale digital computers often have a facility for optimizing instruction code as written by the programmer. It is generally true that optimizer facilities can do a better job of optimization on a long block of code than on a shorter block of code. In particular, the use of a branch instruction may break a single block of code into two or more smaller blocks of code, with the attendant degradation of code optimization.

Accordingly, it is a general object of this invention to provide apparatus which allows the processing mechanism of a digital computer to skip from a first instruction to a subsequent instruction other than the next sequential instruction in an instruction sequence, without the use of a branch instruction.

A more particular object of the invention is to provide apparatus in a digital computer for skipping over one or more instructions in a sequence of instructions.

Still another object of this invention is to provide apparatus in a digital computer to accomplish the skipping of one or more instructions in a sequence of instructions with a minimum of equipment and a minimum of time.

It is another object of this invention to provide apparatus in a digital computer for skipping one or more instructions in a sequence of instructions, while restricting the structure of the sequence of instructions to a single block.

SUMMARY OF THE INVENTION

Apparatus for allowing a digital computer to skip certain predetermined instructions is disclosed. This is accomplished by providing means for detecting an instruction designated as a skip instruction. In a digital computer in which the present invention finds application, instructions are included which comprise an operation code field, for designating the type of instruction, and at leas first and second fields, hereinafter referred to as *i*-field and *j*-field, respectively, and also a bit hereinafter referred to as the skip flag, which when set to a one indicates that the instruction is to be skipped upon detection of a previous skip instruction and a given machine condition.

In particular, several types of skip instructions are defined, each designating a particular machine condition. Upon the decoding of a given type of skip instruction and the successful determination of its included machine condition, each instruction in the sequence following that skip instruction, and having its skip flag on, will be skipped. Skipping of such flagged instructions will continue until the next skip-type instruction, not having its skip flag set to a one, at which time the second skip-type instruction will be decoded and its machine condition determination will be resolved to determine whether or not flag instructions subsequent to said second skip-type instruction will be skipped.

In one aspect of our invention, a shift-down device is provided. This shift-down device includes a first group of shift-down buffers and a second group of shift-down buffers. Members of the first group of shift-down buffers receive instructions from a source of a sequence of instructions, and some members also receive instructions from other members of the first group by way of being shifted down in the device. The second group of shift-down buffers receives the instructions by way of shift-down from specified members of the first group of shift-down buffers or by way of shift-down from other members of said second group of shift-down buffers. The final shift-down buffer in the second group functions as an instruction register. Each instruction reaching this register is decoded by having its operation code field decoded in an instruction decoder and its *i*- and *j*-fields each decoded by an auxiliary decoder. The instruction decoder identifies the type of instruction and sends information to the various computation facilities of the machine for processing of the given instruction. If the instruction is a skip-type instruction, then signals indicative both of the fact that it is a skip instruction, and of the machine condition to be determined are sent to a function generator. The auxiliary decoders for the *i*- and *j*-fields provide an indication of information to be tested to determine the machine condition indicated. This information is ultimately transmitted to the function generator. The function generator performs the condition determination to be made and emits either of two indications.

The first indication connotes that the instruction decoded is a skip-type instruction, and that the machine condition has been determined as successful. Thus, all flagged instructions subsequent to this skip instruction, and previous to a second skip-type instruction with its skip flag off, are to be skipped. This is accomplished by providing means responsive to this first indication to inhibit the processing of these flagged instructions. One way for accomplishing this is to provide logic, hereinafter referred to as No-Op Logic, for setting a bit in certain buffers of the shift-down device which contain a flagged instruction. This bit, hereinafter referred to as the No-Op bit, will control skipping in the majority of situations.

Buffer shift designation logic and shift-down logic are also provided. The buffer shift designation logic is responsive to the said No-Op bit and provides signals to the shift-down logic for shifting the contents of specified buffers down into the buffers having their No-Op bit set to one, without previously shifting out the contents of these last-named buffers. This results in electronically writing over the instructions which are to be skipped, thus effecting their skipping. A special skip circuit, comprising instruction decode inhibit logic, is included in the bottom buffer of the shift-down device to take care of a singular skipping not controlled by the set No-Op bits.

The buffer shift designation logic also provides signals for entering new instructions from the source of the sequence instructions into the first group of shift-down buffers to continue the processing sequence.

Numerous advantages are offered by our invention. Primary among these is the elimination of branch points when instructions are to be skipped. Prior to our invention, in order to skip one or more instructions it was necessary to perform a branch, entailing the processing of a branch exit. The processing of branch exits seriously impairs central processing unit performance. For example, considering the following program steps.

IF *a*X=A×Y+B

Z=XC Prior to our invention, a central processing unit would execute the above program steps in the following manner:

BRANCH If not *a*
X=A×Y
X=B+X
Z=ZC

Thus, prior to our invention a branch had to be performed on whether or not the condition (*a*) occurred. If the condition occurred, the program would "fall through" and perform the multiplication of A and Y and add B to the product. If the condition did not occur, the program branched to the divide instruction. In either event the sequencing unit was forced to process the branch exit. The processing of branch exits seriously degrades computer performance. This processing of a branch exit is eliminated by the apparatus of our invention, whereby the above program steps would be accomplished as seen below:

SKIP If not (a) ─┐
$X^* = A \times Y$
$X^* = X + B$
$Z \ = X \div C$ ←┘

In the above schematic example, the starred instructions indicate instructions with their skip flag set to one, according to the apparatus of our invention. If the *a*condition fails, then the skip instruction is considered successful and the two starred examples are immediately skipped by being ignored, and there is no longer a need for processing a branch exit.

A second advantage of the present invention is in the ability to optimize written code. As mentioned earlier, there is a higher probability of optimizing a single long block of code than in optimizing several short blocks of code. Hence, another example of an advantage of our invention is seen schematically in the table below:

| With branch | | With skip | |
|---|---|---|---|
| Code | Structure | Code | Structure |
| OP | | OP | |
| BRANCH to α | Test | SKIP | |
| OP | | OP* | |
| OP | 1 | OP* | 1 |
| OP | | OP* | |
| α OP | 2 | OP | |
| OP | | OP | |
| OP | | OP | |

As seen in the first column of the above schematic, in order to branch upon a successful test after a first instruction, to an instruction designated α, it is necessary to process a branch exit. The corresponding code structure is thereby broken up into segments 1 and 2. However, by utilizing the apparatus of the present invention it is possible merely to skip the three starred instructions without processing a branch instruction. Thus, the code structure is a single long block 1, rather than two short blocks 1 and 2, thus allowing a higher probability of code optimization.

Accordingly, the foregoing and other objects, features, and advantages of the invention will be apparent from the following more particular description of a preferred embodiment of the invention, as illustrated in the accompanying drawings.

BRIEF DESCRIPTION OF THE DRAWINGS

FIGS. 10A through 12B are representations of illustrative examples of the operation of the invention.

DESCRIPTION OF PREFERRED EMBODIMENT

Structure

Figure 1:
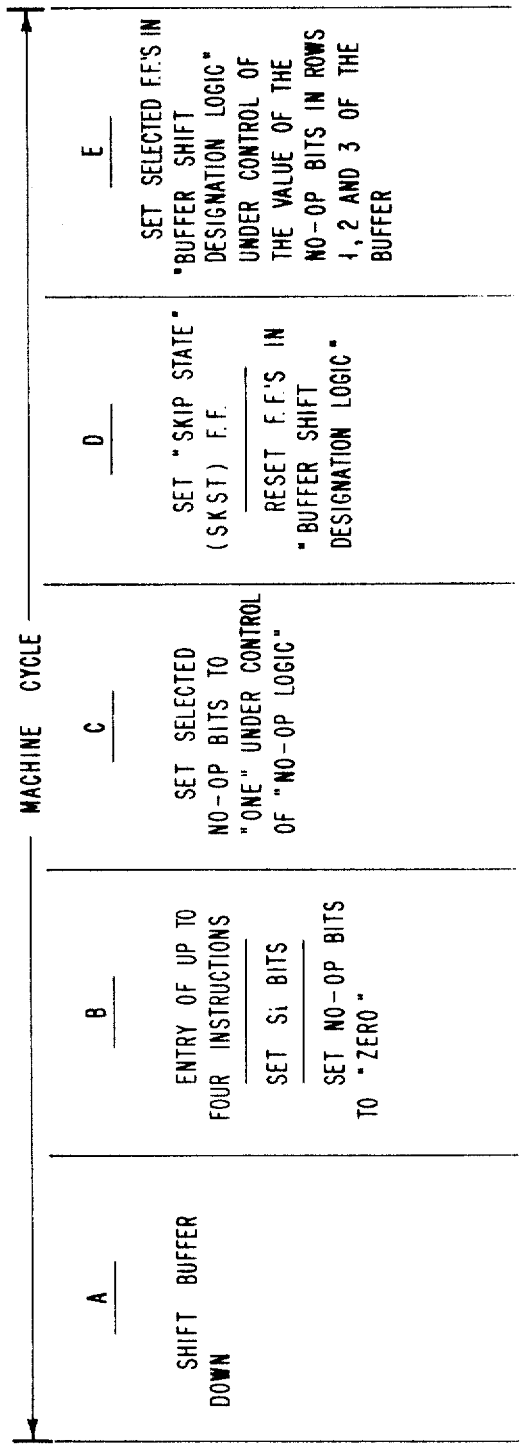
FIG. 1 is a representation of the events occurring at various parts of a typical machine cycle, according to the present invention.
Figure 1A:
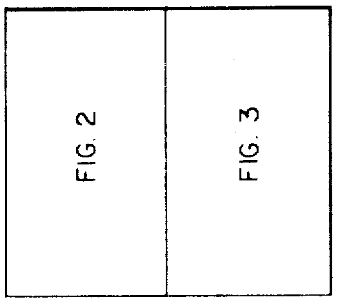
FIG. 1A shows the manner in which FIGS. 2 and 3 should be placed relative to each other, for ease of understanding.
Figure 2:
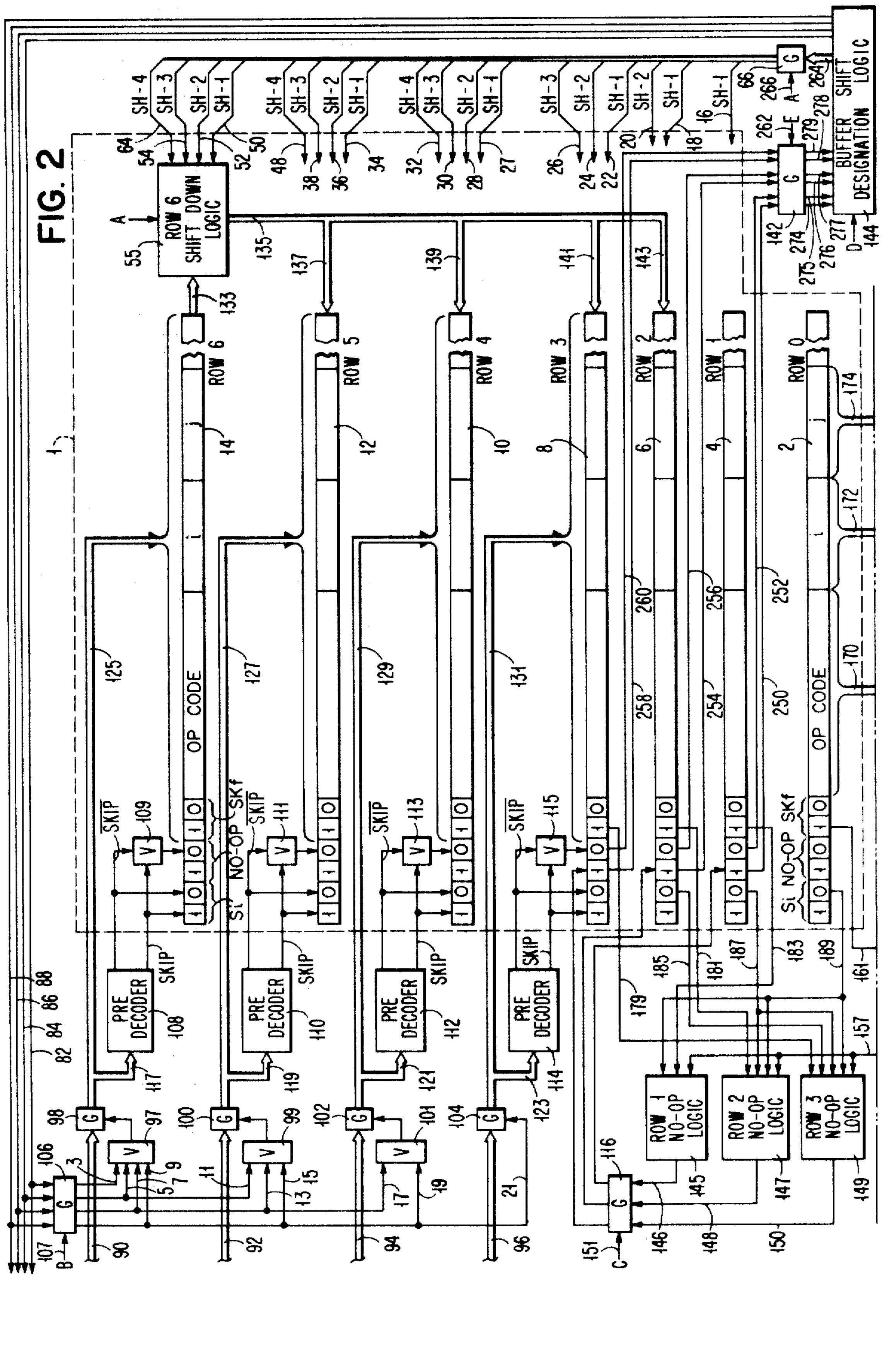
FIG. 2 shows that portion of our invention including the shift-down device, the No-Op logic, the buffer shift designation logic, and the shift-down logic.
Figure 3:
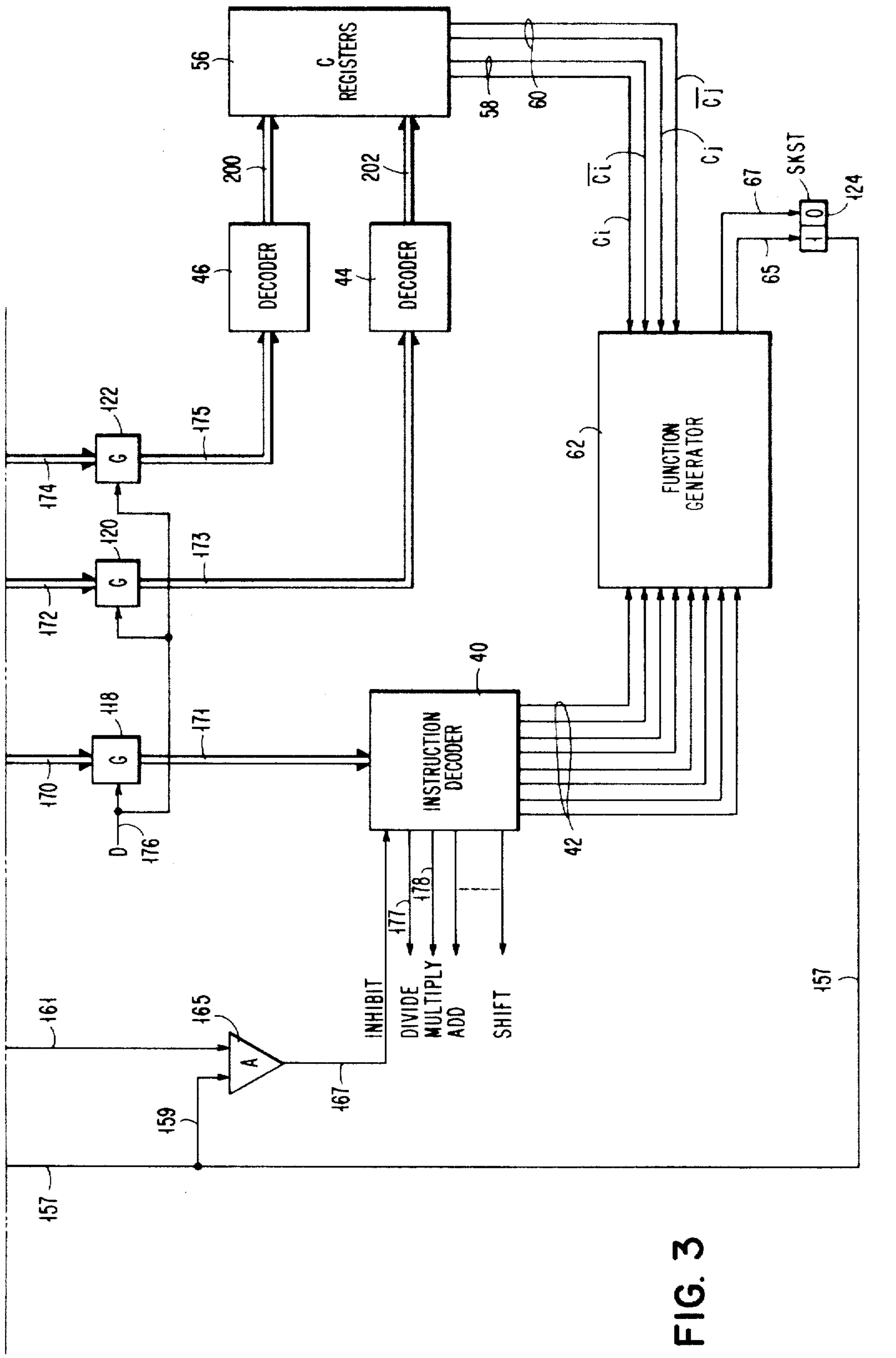
FIG. 3 shows a portion of our invention including the instruction decoder, the auxiliary decoders, the condition registers, and the function generator.

The structure of an embodiment of our invention is seen generally in FIGS. 2 and 3, placed adjacent each other as seen in 1A. Before proceeding with the description of FIGS. 2 and 3, it is to be noted that the operation of this embodiment, described subsequently, is in terms of a machine cycle having five subtimes, namely A, B, C, D, and E. This is seen schematically in FIG. 1. Subsequent references to a machine cycle subtime, such as for example, A-time, indicates a pulse that occurs during that portion of the machine cycle of FIG. 1 indicated as A-time.

With reference to FIG. 2, a source of a sequence of instructions, not shown, is connected to busses 90, 92, 94, 96, in a sequential manner such that the earliest instruction of a group in a subsequence of instructions transmitted over these busses is transmitted over bus 96, and the latest instruction thereof is transmitted over line 90. A shift-down device, seen generally at 1, is provided. This shift-down device comprises buffer registers 2, 4, ..., 14. These buffers will hereinafter be respectively referred to as row 0, row 1, ..., row 6. These rows are each shift-down buffers. Rows 3—6 inclusive, can be characterized as a first group of shift-down buffers and rows 0—2, inclusive, can be characterized as a second group of shift-down buffers. Each member of said first member of shift-down buffers is respectively connected to busses 90, ..., 96 by means of busses 125, 127, 129, 131, via gates 98, 100, 102, 104.

Figure 9A:
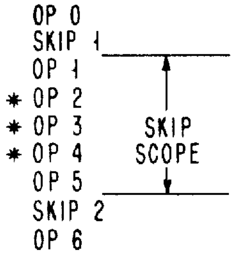
FIG. 9A is a representation of the skip scope as used in the invention.
Figure 9B:
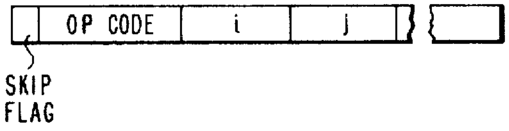
FIG. 9B is a representation of an instruction structure useful in the invention.

Looking ahead momentarily, reference is made to FIG. 9B for an explanation of a generalized configuration of an instruction used in a machine of the class described. With reference to that FIG., it is seen that in general an instruction useful in the invention includes at least an operation code field and first and second fields, hereinafter referred to as the *i*-field and the *j*-field. Also, each instruction includes a bit, settable to one or zero, and hereinafter referred to as the skip flag. The Op code of the instruction designates the operation which the instruction signifies. For example, if an Op code is 8 bits wide, there is a possibility of 256 operations which that field can signify. In the present invention, skip instructions comprise a subset of the group of possible instruction configurations. Skipping action is conditional on a function of 2 bits of a condition register, explained subsequently, which function can be viewed as a machine condition. To specify a skip, two parameters are required: (1) whether or not the skip is to be made, the condition determination; and (2) the instructions to be skipped. The condition determination indicates whether or not the skip is to be taken, and is computed as a function of 2 bits selected from the condition register. The *i*- and *j*-fields of the instruction select the bits of the condition register. The function which is computed is specified by the operation code. If the value of the function is true, the skip is called successful and the flagged instructions within the scope of the skip will be ignored. If the value of the function is false, the skip is called unsuccessful and subsequent instructions are executed normally. Eight functions can be specified, as seen in Table 1. These are merely illustrative, and it is recognized that many more can be specified without departing from the spirit and scope of our invention.

TABLE 1

| | |
|---|---|
| $C_i$ and $C_j$ | $C_i$ or $C_j$ |
| $C_i$ and $\overline{C_j}$ | $C_i$ or $\overline{C_j}$ |
| $\overline{C_i}$ and $\overline{C_j}$ | $\overline{C_i}$ or $\overline{C_j}$ |
| $C_i = C_j$ | $C_i \neq C_j$ |

Thus, for example, and assuming an 8-bit Op code, a specific bit configuration of the high order 5 bits would indicate that the instruction is a skip instruction and the low order 3 bits of the instruction indicates which of the above eight functions is to be computed to determine whether or not the skip is to be taken.

Having explained the generalized configuration of an instruction used in the operation of the apparatus of our invention, we will refer back to FIG. 2, where it can be seen that each transmission bus 125, ..., 131 has an extension 117, 119, 121, 123 for gating the five high order bits of the Op code section of the instruction into predecoders 108, 110, 112, 114. Each of these predecoders is for the purpose of determining whether or not the instruction is a skip. If, for the example given, the 5 high order bits is the specific bit configuration of a skip instruction, the $S_i$ bit of the respective row is set to a one. If it is not a skip instruction, the $S_i$ bit is set to a zero. In either case the No-Op bit is initially set to zero via OR gates 109, 111, 113, 115. Shift-down logic is provided for each row. This shift-down logic, explained in detail subsequently, gives each row the capability of shifting its contents downward. For example, shift-down logic 55 is provided for row 6. Bus 133 is controlled by shift-down logic 55 such that the contents of row 6 can be shifted down one row via bus 137, two rows via bus 139, three rows via bus 141, or four rows via bus 143. Similar busing and shift-down logic is provided for each row but only that for row 6 is shown, in the interests of preserving drawing clarity. While rows 6, 5, and 4 have the capability of shifting downwards to a maximum of 4 rows, it will be appreciated that, due to the size limitations of the buffer, row 3 can be shifted down a maximum of three rows, row 2 a maximum of two rows, and row 1 a maximum of one row.

With continued reference to FIGS. 2 and 3, it is seen that the contents of that portion of row 0 representing the Op code of a particular instruction are connected via gate 118 to instruction decoder 40 by way of bus 170. Likewise, the bits of row 0, representative of the *I*- and *j*-fields, respectively, are connected via gate 120 and 122 to decoders 44 and 46, by way of busses 172, 174, respectively. Gates 118, 120, 122 have enabling line 176 which is activated at D-time. Decoders 40, 44 and 46 are conventional binary to one out of N type decoders, well-known in the art, and will not be described further here. Decoder 46 is connected by way of bus 200 to condition registers 56, subsequently explained in detail. Likewise, decoder 44 is connected via bus 202 to condition registers 56. Function generator 62 is provided for computing the function of the bits indicated by the *i*- and *j*-fields. Function generator 62 will subsequently be explained in detail. Condition registers 56 are connected to function generator 62 via lines $C_i$, $\overline{C_i}$, $C_j$, and $\overline{C_j}$. $C_i$, $\overline{C_i}$ will indicate the true and complement value, respectively, of the bit of the condition register specified by the *i*-field while $C_j$, $\overline{C_j}$ indicate the true and complement value of the condition register specified by the *j*-field. Instruction decoder 40 has outputs indicative of the type of instruction which is decoded from row 0. For instance, if the instruction is a divide instruction, a signal will be transmitted via line 177 to the divider facility of the digital computer, not shown. Likewise, a multiply instruction will activate line 178, and so on. If the instruction is a skip instruction, one of lines 42 will be activated. Output lines 42 of instruction decoder 40 are connected to function generator 62. Eight output lines are shown, corresponding to the eight functions of the condition register bits selected by the *i*- and *j*-fields of the skip instruction, according to the present illustration.

Skip state (hereinafter referred to as SKST) flip-flop 124 is also provided. Line 157 is connected to the one side of SKST flip-flop 124. Function generator 62 is connected via line 65 to the one side of SKST flip-flop 124 and to the zero side of the SKST flip-flop via line 67. As will hereinafter be made clear, line 65 indicates that the condition of the decoded skip instruction has been determined as successful and that the apparatus is in the skipping mode; that is, all subsequent flagged instructions will be skipped until the next unflagged skip instruction. Line 67 indicates that the condition has been determined as unsuccessful and that the apparatus is not in the skipping mode.

No-Op logic circuitry 145, 147, 149 is provided to set the No-Op bits for row 1, row 2, row 3, respectively, if the skip flag of the respective instruction in these rows indicate the instruction is to be skipped when in the skip mode. As will be made clear, these No-Op bits will control skipping of instructions in rows 1, 2 and 3. For the present illustration, each No-Op logic circuit can be considered as an AND gate.

Row 1 No-Op logic 145 is conditioned by line 157 which is indicative of whether or not the apparatus is in a skipping mode; by the zero side of the $S_i$ bit of row 0 via line 189, and by the one side of the skip flag of row 1 via line 183. The No-Op bit of row 1 is set by line 146 at C-time of a given cycle and this No-Op bit will control the skipping of the instruction in Row 1 at A-time of the next cycle as will be subsequently made clear. Since instruction decoding is performed at D-time, it is necessary to inhibit the setting of the row 1 No-Op bit if the instruction in row 0 is a skip at C-time since it is not yet known whether this skip instruction in row 0 is successful. Therefore, line 189 is an enabling input to row 1 No-Op logic 145.

Row 2 No-Op logic 147 is conditioned by line 157; by the one side of the skip flag of row 2; and by the zero side of the $S_i$ bit in row 0 via line 189 and by the zero side of the $S_i$ bit of row 1 via line 187. These latter two lines serve the same purpose as the conditioning input 189 to row 1 No-Op logic, above.

Row 3 No-Op logic 149 is conditioned by line 157, by the one side of the skip flag of row 3, and by the zero side of the $S_i$ bit of row 0 (line 189), row 1 (line 187) and row 2 (line 181). These latter three conditioning lines serve the same purpose as conditioning input 189 to row 1 No-Op logic, above.

For the singular situation in which an instruction to be skipped is shifted directly to row 0 without being present in any of rows 1, 2 or 3 (and hence not skipped under control of these No-Op bits), inhibit line 167 is provided. This line is the output of AND 165. AND 165 has as inputs lines 159 and 161. If the machine is in the skipping mode (line 159) when an instruction to be skipped is in row 0 (line 161), then inhibit line 167 inhibits the decoding of that instruction. This can be done by means well-known in the art, such as conditioning each output line of instruction decoder 40 with the complement of the inhibit line 167, and will not be further discussed here.

As will be subsequently made clear, buffer shift designation logic 144 is provided to designate how many rows the contents of each row of the shift-down device is to be shifted down. The one and zero side of the No-Op bits of rows 1, 2 and 3 are connected to buffer shift designation logic 144 over lines 250, 252, ..., 260 via gate 142. Gate 142 has enabling line 262 which is activated at E-time. Buffer shift designation logic 144 is essentially a decoder for designating, from the value of the No-Op bits of rows 1, 2, and 3, how many rows the contents of the various rows of the shift-down device will be shifted on a given machine cycle. Buffer shift designation logic 144 is connected over bus 264 via gate 66 to the shift-down logic for each individual row of the shift-down device. Gate 66 has enabling line 266 which is activated at A-time. Bus 264 comprises a plurality of lines. Lines 50, 52, 54, 64 are connected to the shift-down logic 55 for row 6. A signal over line 50 indicates that row 6 will be shifted down one row; a signal over line 52 indicates that row 6 will be shifted down two rows; a signal over line 54 indicates row 6 will be shifted down three rows; and a signal over line 64 indicates row 6 will be shifted down four rows. Likewise, lines 34, 36, 38 and 48 are connected to the shift-down logic for row 5. Lines 27, 28, 30, and 32 are connected to the shift-down logic for row 4. Lines 22, 24, 26 are connected to the shift-down logic for row 3. Lines 18 and 20 are connected to the shift-down logic for row 2, and line 16 is connected to the shift-down logic for row 1. Buffer shift designation logic 144 is also connected to the instruction fetching section of the central processing unit via lines 82, 84, 86, 88. These lines inform the system as to the number of instructions to be furnished to the shift-down device 1. If line 82 is active, only one instruction will be sent and it will appear on cable 90. If line 84 is active, two instructions will be sent and they will appear simultaneously on cables 92 and 90, respectively. If line 86 is active, three instructions will be sent and they will appear on cables 94, 96, and 90, respectively. If line 88 is active, four instructions will be sent and they will appear concurrently on cables 96, 94, 92, and 90, respectively. Lines 82 through 88 are also connected to gate 106. Gate 106 has enabling line 107 which is activated at B-time. Lines 82 through 88 are connected through gate 106 via lines 3, 5, 7, and 9 to OR gate 97 to enable gate 98. Likewise, lines 84 through 88 are connected through gate 106 via lines 11, 13 and 15 to OR gate 99 to enable gate 100. Lines 86 and 88 are connected through gate 106 via lines 17 and 19 to OR gate 101 to enable gate 102, and line 88 is connected to gate 106 via line 21 to enable gate 104.

DETAILED DESCRIPTION OF CONDITION REGISTER

Figure 8:
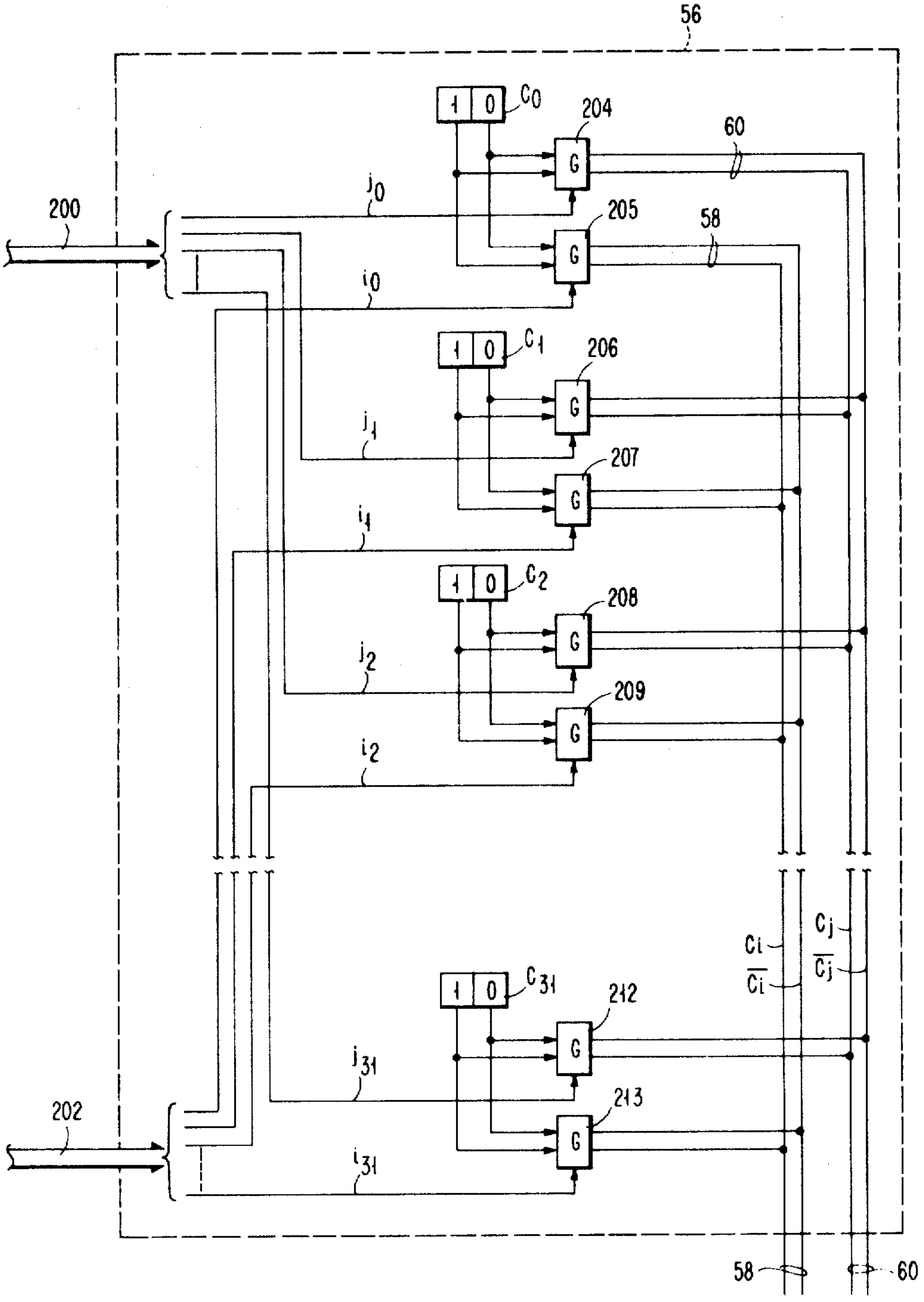
FIG. 8 is a detailed representation of the condition register seen generally in FIG. 3.

The detailed structure of an embodiment of the condition register, seen generally at 56 in FIG. 3, will now be explained in detail with reference to FIG. 8. This register comprises a plurality of flip-flops, here shown as 32 in number and designated $C_0, C_1, C_2, \ldots, C_{31}$. Two pairs of output lines 58, 60 are provided as outputs from the condition register. The lines in 58 comprise $C_i$ and $\overline{C}_i$, indicative of the true and complement value, respectively, of the contents of the bit of the condition register designated by the *i*-field in the instruction in row 0. Likewise, the lines in group 60 are designated $C_j$ and $\overline{C}_j$, indicative of the true and complement value, respectively, of the bit of the condition register indicated by the *j*-field of the instruction in row 0. Each flip-flop in the condition register is connected to output lines 58, 60 through suitable gating means such as 204, 205 illustrated for bit $C_0$. It will be recalled that *i*-field decoder 44 and *j*-field decoder 46 were conventional binary to one out of N decoders. For the present example, it can be assumed that N is equal to 32 lines. Thus, the *i*-field and the *j*-field will each indicate one out of 32 bits of the condition register upon which a function will be computed in the function generator 62 to determine whether or not the condition designated by a skip instruction in row 0 is successful. Bus 200 is seen in FIG. 8. Each wire indicative of the bit selected by the *j*-field is indicated $j_0, j_1, j_2, \ldots, j_{31}$ and serves to gate the value of the selected bit via gates 204, 206, 208, ..., 212. Likewise, bus 202 enters condition register 56 and each line of the bus indicates the particular bit of the condition register selected by the *i*-field. These are designated $i_0, i_1, i_2, \ldots, i_{31}$ and serve to gate the value of the selected bit via gates 205, 207, 209, ..., 213. Thus, upon energization of gates 120 and 122 over line 176 at D-time, decoders 44 and 46 will decode the value of the *i*- and *j*-fields, respectively, which each designate a particular bit in the condition register upon which a function will be computed and tested to determine whether the skip in row 0 will be successful. Thus, for example, if the *j*-field designates bit 0 and the *i*-field designates bit 31, the value of the contents of bit $C_0$, either zero or one, will be gated to line 60 via gate 204 and the value of bit $C_{31}$, either zero or one, will be gated to lines 58 via gate 213. The values of bits $C_0, \ldots, C_{31}$ are dependent upon various machine conditions, according to the requirements of the system and are set by means within the system which do not form a part of this invention.

DETAILED STRUCTURE OF FUNCTION GENERATOR

Figure 7:
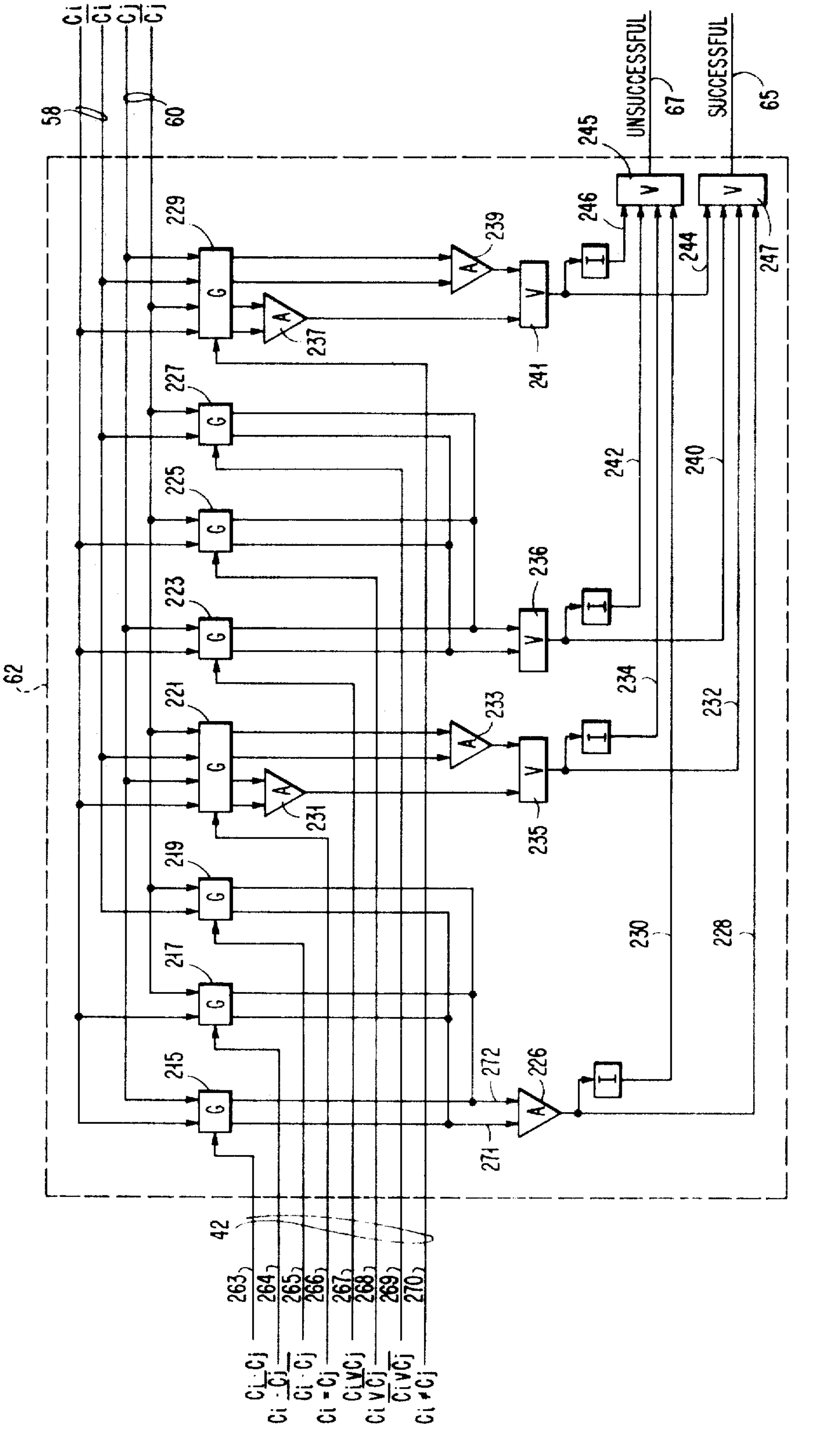
FIG. 7 is a detailed representation of the function generator seen generally in FIG. 3.

The function generator seen generally at 62 of FIG. 3 is seen in detail in FIG. 7. It will be recalled from the description of FIGS. 2 and 3 that instruction decoder 40 decodes the Op code field of the instruction in row 0. If that function, when decoded, is found to be a skip instruction, the type skip instruction is indicated by one of the output lines 42. That is, the particular one of lines 42 which is activated will indicate the function of the two bits of the condition register, specified by the *i*-field and *j*-field, which is to be computed. Referring to FIG. 7, lines 42, comprising lines 263, 264, 265,..., 270 form gating inputs to the function generator. The two pairs of lines 58, 60 from the condition registers, explained above, are also inputs to the function generator. Lines 58 are indicative of the true and complement values of the particular bit of the condition register selected by the *i*-field, while lines 60 are indicative of the true and complement values of the particular bit of the condition register selected by the *j*-field. Function generator 62 also includes output lines 65 which indicates that the specified function of the selected bits of the condition register has been computed as true and the skip will be successful to provide a first indication, namely a signal over line 157 from the one side SKST flip-flop 124 of FIG. 3, indicative of the fact that flagged instructions subsequent to the instruction in row 0 are to be skipped until another skip instruction, without its skip flag on, is decoded in row 0. Line 67 is provided which, when activated, indicates that the specified function of the two bits selected by the *i*- and *j*-fields was found to be false and hence the skip is unsuccessful. This line will provide a second indication, by setting the zero side of SKST flip-flop 124 of FIG. 3, thus deactivating line 157 if it was activated, and hence inhibiting the skipping of flagged instructions subsequent to the instruction in row 0 at this time. The function generator of FIG. 7 further includes gates 215, 217, 219, ..., 229. Gate 215 has as an input the true values of bits $C_i$ and $C_j$ and is gated by line 263. Gate 217 has as its input the true value of $C_i$ and the complement value of $C_j$ and is gated by line 264. Gate 219 has as its value the complement of $C_i$ and the complement of $C_j$ and is gated by line 265. The outputs of gates 215, 217, 219 are connected as inputs to AND gate 226. Thus, activation of line 263, 264, or 265 will provide an indication on line 228 if the AND function of the specified inputs is true and thus will activate line 65 via OR gate 247. If the value of the AND function is false, line 230 will activate line 67 via gate 245. Gate 221 has as its input both the true and complement values of both $C_i$ and $C_j$ and is gated by line 266. Upon gating by line 266, the true values of $C_i$ and $C_j$ are gated to AND gate 231 and the complement values of $C_i$ and $C_j$ are gated to AND gate 233. The output of each said AND gate serves as an input to gate 235 such that if $C_i$ is equal to $C_j$ upon activation the line 266, line 232 will activate line 65 via gate 247. If $C_i$ is not equal to $C_j$ when line 266 is activated, then line 234 will activate line 67 via OR gate 245. Gate 223 has as its input the true values of $C_i$ and $C_j$ and is activated by line 267. Likewise, gate 225 has as its input the true value of $C_i$ and the complement of the value of $C_j$ and is gated by line 268. Gate 227 has as its input the complement values of both $C_i$ and $C_j$ and is gated by line 269. The outputs of gates 223, 225, and 227 are connected as inputs to OR gate 236. Upon activation by any one of lines 267, 268, or 269, OR gate 236 will compute the OR function of the inputs to the respective gates activated and, if the function is true, line 240 will activate line 165 via gate 247 to indicate that the skip is successful and that subsequent flagged instructions should be skipped. If the function is false, line 242 will activate line 67 via gate 245, indicative of an unsuccessful skip. Gate 229 has as its input both true and complement values of both $C_i$ and $C_j$, and is gated by line 270. Upon being enabled by line 270, gate 229 will gate the true value of $C_i$ and the complement value of $C_j$ to AND gate 237, and will gate the complement value of $C_i$ and the true value of $C_j$ to AND gate 239. The outputs of AND gates 237 and 239 connected to the input of OR gate 241, such that upon the true output from either of AND gates 237 or 239, OR circuit 241 will have an output indicative of the fact that $C_i$ is not equal to $C_j$, and line 244 will activate line 165 via OR gate 247. Likewise, if upon the activation of line 270, neither gate 237 nor 239 has a true output, then line 246 will activate line 67 via gate 245 indicative of the fact that the condition determination is false and the skip is unsuccessful. It is to be noted that at most one of the group of lines labeled 42 can be up at any one time and this will occur at some time during D-time since during this time gate 118 has gated the output from row 0 into instruction decoder 40 in FIG. 3. Likewise, at this time, gates 120 and 122 have gated the *i*-field and the *j*-field to decoders 44 and 46 to select the proper bits, $C_i$ and $C_j$ from the condition register 56 of FIG. 3. Therefore, the function generator receives the selected value of the two bits from the condition register and also receives an enabling line from one of the lines 42 indicative of the machine condition upon which a skip is to be successful and computes the function indicative of the condition. If the function is true, the successful line 65 turns the SKST flip-flop to its 1 state. If the function is false, the unsuccessful line 67, sets the SKST flip-flop 124 of FIG. 3 to its 0 state.

DETAILED STRUCTURE OF BUFFER SHIFT DESIGNATION LOGIC

Figure 4:
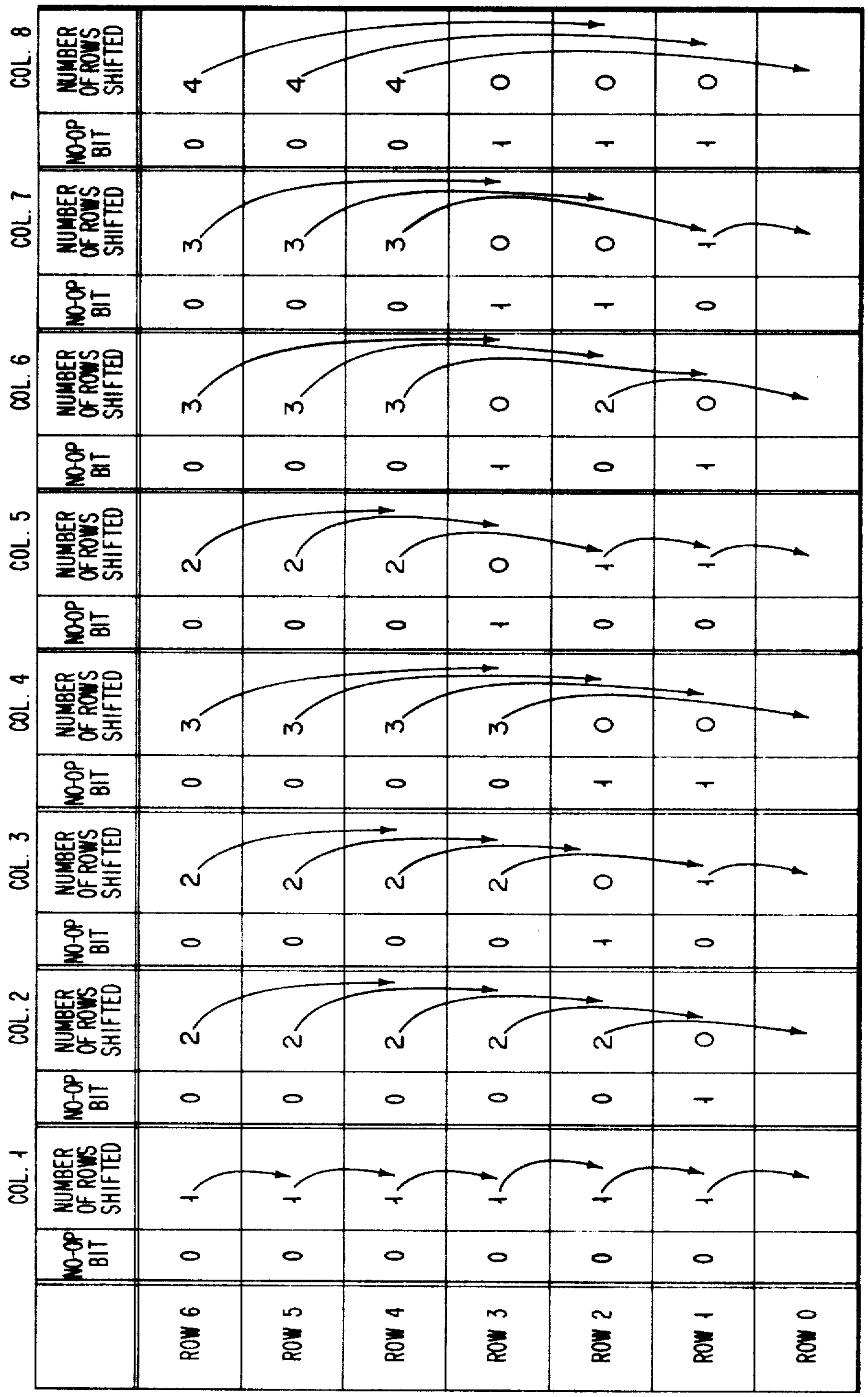
FIG. 4 is a chart showing the manner in which the shift-down device is shifted under control of the value of the No-Op bits in certain members of the second group of shift-down buffers.
Figure 5:
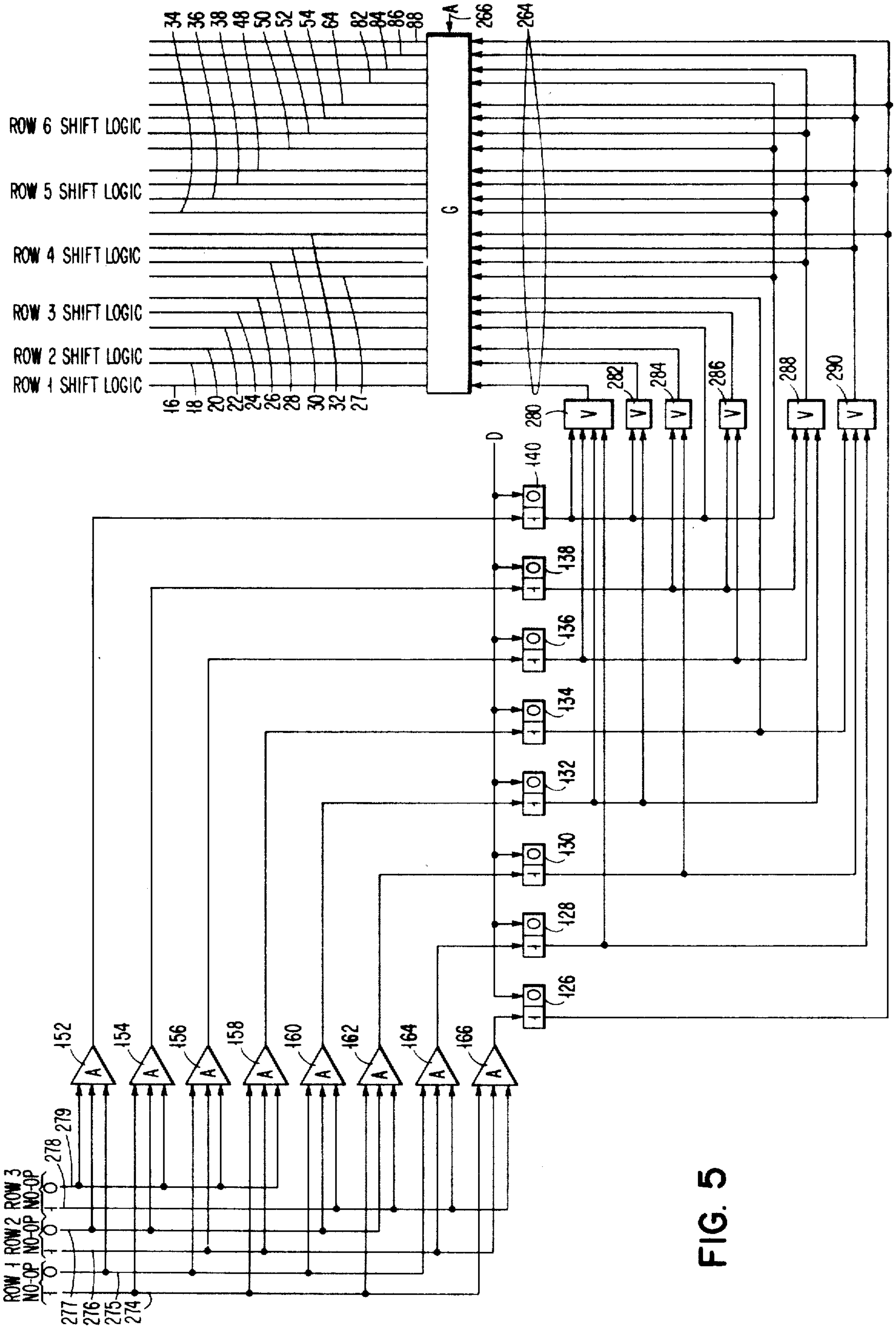
FIG. 5 is a detailed representation of the buffer shift designation logic seen generally in FIG. 2.

The function of the buffer shift designation logic seen generally at 144 in FIG. 2, as previously explained, is to designate how many rows each individual row of the shift-down device is to shift each B -time of a machine cycle. A possible detailed structure for buffer shift designation logic 144 is seen in FIG. 5. In that FIG., lines 274, 275, ..., 279 enter from the No-Op bits of row 1, row 2, row 3. As will become more clearly apparent, whenever a No-Op bit in row 1, row 2, or row 3 is set to a one state, this is indicative of the fact that the instruction presently in that particular row is to be skipped by having an instruction from another row shifted down into that particular row, thus skipping the instruction by electronically writing over it. This can be seen with particularity by reference to the chart of FIG. 4. FIG. 4 is a chart showing the shift-down of each row under control under the value of the No-Op bits in rows 1, 2, and 3. For example, it is seen from column 1 of the chart, that when each No-Op bit for row 1, 2, and 3 is 0, this indicates that no skipping is to be performed. Therefore, each row in the shift-down device is shifted down only one row. This is normal operation for no skipping, in which each row receives a new instruction and, in particular, row 0 receives the instruction from row 1 for decoding and processing. A No-Op bit in row 1, 2, or 3 can never be set to a one unless the system is in a skipping mode. Hence, columns 2 through 8, having at least one No-Op bit on in row 1, row 2, or row 3, indicates that the machine is in the skipping mode. Column 5, for example, indicates that row 3 has its No-Op bit on. This means that the instruction in row 3 is to be skipped, but all other instructions in the shift-down device on this particular cycle are ultimately to be shifted down. Hence, the instruction from row 1 shifts down one row, into row 0 from which it is to be processed. The instruction from row 2 shifts down into row 1. The instruction from row 3 has its No-Op bit on and it is to be skipped. Hence, it does not shift down. The instruction from row 4 shifts two rows into row 2 to take the place of the instruction which was shifted into row 1. The instruction from row 5 shifts down two rows into row 3. This indicates skipping. The instruction from row 5 has been written over the instruction in row 3 which was to be skipped. Finally, the instruction from row 6 is shifted down two rows into row 4. At this point, the instructions are still in the sequence in which they were before shift-down, with the exception that the instruction in row 3, which was to be skipped, has been obliterated by being electronically written over by the instruction which was in row 5. However, there are now no instructions in row 5 or row 6. It is also the function of the buffer shift designation logic 144 to indicate how many new instructions from the instruction sequence source are to be entered into the top of the shift-down device. In the example presently being given, this would be two instructions, indicated by signals on lines 82 and 84 of FIG. 2.

With reference to FIG. 5, it is seen that the buffer shift designation logic includes AND gates 152, 154, ..., 166. Also included are flip-flops 126, 128, ..., 140. Each of the flip-flops has an input conditioning line which is activated at D-time of a given cycle to clear the logic for setting during E-time of that cycle. The outputs of respective ones of the AND gates serve as inputs to the one side of respective ones of the flip-flops, in the sequences 152 to 140, 154 to 138, ..., 166 to 126.

The logic of FIG. 5 further includes OR gates 280, 282, ..., 290. The outputs lines of the one side of flip-flops 128, 132, 136, 140 are connected as inputs to OR gate 280. The output lines from the one side of flip-flops 132, 140 are connected as inputs to OR gate 282; the outputs of flip-flops 130, 138 are connected as inputs to OR gate 284; the outputs of the one side of flip-flops 136, 138 are connected as inputs to OR gate 286; the outputs of the one side of flip-flops 132, 136, 138 are connected as inputs to OR gate 288; and the outputs of the one side of flip-flops 128, 130, 134 are connected as inputs to OR gate 290.

The output lines of buffer shift designation logic 144 proceed from the above logic via gate 66 as follows. Output line 16 proceeds from OR gate 280 and when activated indicates that row 1 is to be shifted down one row. Output line 18 proceeds from OR gate 282, and when activated indicates that row 2 is to be shifted down one row. Output line 20 proceeds from OR gate 284, and when activated indicates that row 2 is to be shifted down two row. Output line 22 proceeds from the one side of flip-flop 140 and when activated indicates that row 3 is to be shifted down one row. Output line 24 proceeds from OR gate 286, and when activated indicates that row 3 is to be shifted down two rows. Output line 26 proceeds from the one side of flip-flop 134 and when activated indicates that row 3 is to be shifted down three rows. Output line 27 proceeds from the one side of flip-flop 140 and when activated indicates that row 4 is to be shifted down one row. Output line 28 proceeds from OR gate 288, and when activated indicates that row 4 is to be shifted down two rows. Output line 30 proceeds from OR gate 290 and, when activated indicates that row 4 is to be shifted down three rows. Output line 32 proceeds from the one side of flip-flop 126, and when activated indicates that row 4 is to be shifted down four rows. Output line 34 proceeds from the one side of flip-flop 140 and indicates that row 5 is to be shifted down one row. Output line 36 proceeds from the flip-flop 288, and when activated indicates that row 5 is to be shifted down two rows. Output line 38 proceeds from OR gate 290, and when activated indicates that row 5 is to be shifted down three rows. Output line 48 proceeds from the one side of flip-flop 126, and when activated indicates that row 5 is to be shifted down four rows. Output line 50 proceeds from the one side of flip-flop 140, and when activated indicates that row 6 is to be shifted down one row. Output line 52 proceeds from OR gate 288, and when activated indicates that row 6 is to be shifted down two rows. Output line 54 proceeds from OR gate 290, and when activated indicates that row 6 is to be shifted down three rows. Output line 64 proceeds from the one side of flip-flop 126, and when activated indicates that row 6 is to be shifted down four rows. It will be noted that these output lines comprise the output bus indicated at 264 from logic 144 of FIG. 2. Thus, these last-named output lines comprise the inputs to gates 66 of FIG. 2 and are gated at A-time to indicate to the individual shift-down logic circuits the number of rows which each individual row is to be shifted down at the proper time of a machine cycle.

Output lines 82, 84, 86, 88 function to inform the source of the sequence of instructions how many instructions are to be provided on a given cycle to replace instructions shifted out of various of the rows. These lines also ultimately provide a gating signal during B-time for gates 98, 100, 102, and 104, to gate the requested number of instructions into these vacant rows. Line 82 proceeds from the one side of flip-flop 140. Line 84 proceeds from OR gate 288. Line 86 proceeds from OR gate 290 and line 88 proceeds from the one side of flip-flop 126.

The input lines to the logic of FIG. 5 are the true and complement values of the individual No-Op bits of rows 1, 2 and 3. Thus, the complement values of the No-Op bits for rows 1, 2 and 3 are inputs to AND gate 152. The true value of the No-Op bit of row 1 and the complement values of the No-Op bits for rows 2 and 3 are inputs to AND gate 154. The true value of the No-Op bit for row 2 and the complement values of the No-Op bit for rows 1 and 3 form inputs to AND gate 156. The true values of the No-Op bits for row 1 and 2 and the complement value of the No-Op bits for row 3 form inputs for AND gate 158. The complement values of the No-Op bits for rows 1 and 2 and the true value of the No-Op bit for row 3 form inputs for AND gate 160. The true value of the No-Op bits of rows 1 and 3 and the complement value of the No-Op bit of row 2 form inputs to AND gate 162. The complement value of the No-Op bit for row 1 and the true value of the No-Op bits for rows 2 and 3 form inputs to AND gate 164. The true values of the No-Op bits of rows 1, 2 and 3 form inputs to AND gate 166.

Thus, it can be seen that the buffer shift designation logic seen in detail in FIG. 5 comprises a decoder which decodes the value of the three No-Op bits and sends a signal to each row's shift-down logic to indicate the number of rows the contents of that row is to be shifted downwardly; and further provides signals on lines 82, 84, 86, 88 to indicate how many new instructions are to be provided to shift-down device 1 of FIG. 2. This can be seen in out current examples relative to Col. 1 and Col. 5 of the chart of FIG. 4.

It will be recalled from the discussion of the chart of FIG. 4 that all No-Op bits in rows 1, 2 and 3 were zero for column 1, indicative of the fact that no skipping is to take place by overwriting of instructions, and hence all rows of the buffer are to be shifted downward. This results in the instruction in row 1 being shifted into row 0 for decoding and subsequent processing, and all other instructions shifting down one, with the further result that row 6 is empty and requires one new instruction from the system. Applying this to FIG. 5, it is seen that lines 275, 277 and 279 (the complement values of the No-Op bits of rows 1, 2 and 3) will be activated. Thus, there will be an output from AND gate 152 turning flip-flop 140 to its 1 state. Therefore, the output lines of flip-flop 140 will activate lines 16, 18, 22, 27, 34, and 50. These lines, as explained above and seen graphically in FIG. 2, indicate to the shift-down logic of each individual row that the contents of that particular row is to be shifted down one row, in accordance with the dictates of column 1 of FIG. 4. Hence, each row will shift down one leaving row 6 vacant. The output of the true side of flip-flop 140 also activates line 82 which, as seen from FIG. 2 proceeds to the source of the sequence of instructions, not shown, to indicate that one instruction is to be provided to the shift-down device 1. At B-time, line 82 will be gated through gate 106 and will activate OR gate 97 via line 3 to enable gate 97 which will allow the requested instruction to proceed from bus 90 to bus 125 to be entered into row 6, the vacant row of shift-down device 1. The Op-code portion of the instruction will also proceed over bus 117 to predecoder 108. If decoded as a skip instruction,the $S_t$ bit will be set to a 1 and if decoded to be not a skip instruction, the $S_t$ bit will set to a 0. In any event, OR gate 109 will be activated to set the No-Op bit for the particular row, here row 6 in which an instruction is entered from the source of the sequence of instructions, to a zero.

For the example of column 5, wherein the row 3 No-Op bit is set to a one indicative that row 3 is to be skipped by overwriting, the buffer shift designation logic functions as follows. With reference to FIG. 5, lines 275, 277, and 278 are active. Therefore, AND gate 160 will have an output which turns flip-flop 132 to its one state. The output of the one side of flip-flop 132 activates line 116 indicating that row 1 should be shifted downward one row and therefore not skipped; activates line 18 via OR 280 to indicate that row 2 should be shifted downward and not skipped; and via OR gate 288 activates lines 28, 36, 52, and 84. It will be noted that none of lines 22, 24, 26 are activated for the shift logic of row 3. This indicates that the instruction in row 3 (which is to be skipped) is not shifted. Hence, the activation of lines 16 will shift the instruction from row 1 down into row 0 for subsequent row processing; and the activation of line 18 will shift the instruction in row 2 down one row into row 1 to replace the instruction in row 1 which is shifted into row 0. The instruction in row 3 is shifted. The instruction in row 4, by virtue of activation of line 28, is shifted downward two rows into row 2 to replace the instruction in row 4, by virtue of activation of line 28, is shifted downward two rows into row 2 to replace the instruction shifted from that row into row 1. The instruction from row 5, by virtue of the activation of line 36 is shifted downwardly two rows into row 3. This writes over the instruction in row 3 which is to be skipped and thus obliterates it. The instruction is therefore skipped at this point in the instruction stream without the necessity of the computer processing a branch exit. Likewise, the instruction in row 6, by virtue of the activation of line 52, is shifted downward two rows to replace the instruction in row 4 which was shifted into row 2. It will be noted that this leaves rows 5 and 6 vacant. The activation of lines 82 and 84 of FIG. 5 signals the source of the sequence of instructions to send over the next two instructions in the sequence. This can be seen from FIG. 2. 82 and 84 are sent to the source of the sequence of instructions. The source furnishes the two instructions on busses 92 and 90. At B-time, gate 106 is activated via line 107 so that the signal activating lines 82 and 84 will be gated to OR gates 97 and 99 to enable gates 100 and 98 to enter the next two instructions in the sequence, via busses 127 and 125 to rows 5 and 6, respectively. Predecoding is accomplished in predecoders 110 and 108 and the $S_t$ and No-Op bits are set as previously explained.

Thus, from the above example, it can be seen that buffer shift designation logic is essentially a decode mechanism and activates various ones of the input lines to the shift-down logic circuitry for specified rows to indicate the number of rows that the instructions in that particular row should be shifted downwardly. It will be noted that lines 82, 84, 86 and 88 which order new instructions in the sequence for entering into those rows of the shift-down device which will become vacant, become active according to the number of shifts in rows 4, 5 and 6. That is, if rows 4, 5 and 6 shift down only one space, row 6 will become vacant. Then line 82 will be active to permit one instruction to be entered into row 6 of the buffer. If rows 4, 5 and 6 each shift down two rows, this vacates rows 5 and 6. Line 84 is active under this condition to enter two new instructions, one into row 5 and the other into row 6. If rows 4, 5 and 6 each shift down three rows, then rows 4, 5 and 6 will become vacant and line 86 becomes active to enable the entering of three new instructions in the shift-down device, one each in rows 4, 5 and 6. For the situation in which rows 4, 5 and 6 are shifted down four rows, as seen in COL. 8 of FIG. 4, this means that rows 4, 5 and 6 become vacant. Row 3, in this situation, has its No-Op bit set to a 1 indicating that row 3 should be skipped. Row 3 is skipped in this instance by entering a new instruction from the instruction sequence source into row 3 thus obliterating the instruction to be skipped in row 3. Furthermore new instructions are to be entered into rows 4, 5 and 6.

ROW SHIFT-DOWN LOGIC

Figure 6:
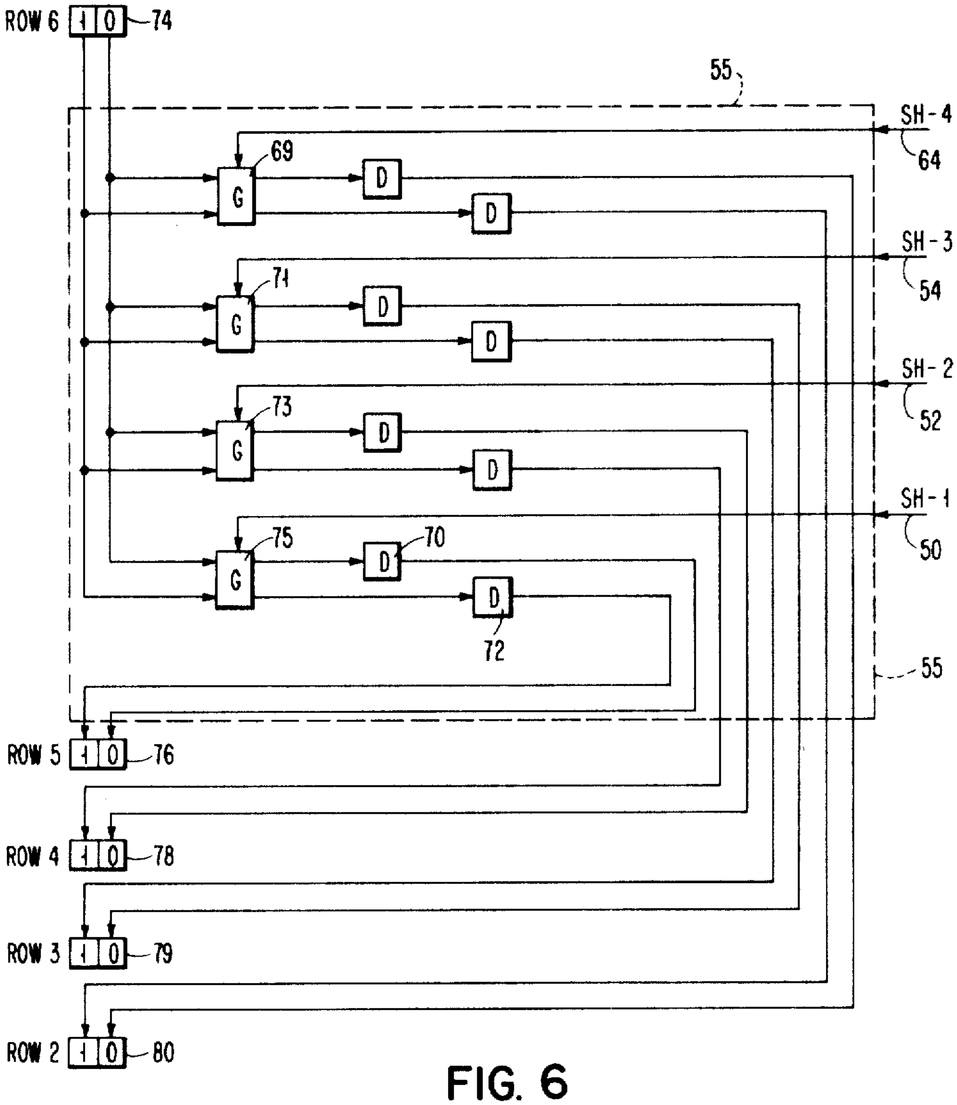
FIG. 6 is a detailed representation of the shift-down logic seen generally in FIG. 2.

An example of a possible embodiment of the shift-down logic for each row is seen in FIG. 6. This particular example is for row 6 shift-down logic, but each row's shift-down logic will be similar. From row 6, it will be possible to shift down a maximum of four rows. Hence, row 6 shift-down logic has four outputs. Since it is possible to shift downwardly a maximum of four rows from rows 4 and 5, the shift-down logic for rows 4 and 5 will also have four outputs that will be identical to the shift-down logic for row 6. However, since row 3 can shift down a maximum of only three rows, the shift-down logic for row 3 will be similar to that for rows 4, 5 and 6, but will only have three outputs, namely one to row 2, one to row 1, and one to row 0. Likewise, since row 2 can shift down a maximum of only two rows, the shift-down logic for row 2 will have only two outputs, one to row 1 and one to row 0. Finally, since row 1 can shift down only one row, it will have only one output, namely to row 0.

With reference to FIG. 6, there is seen flip-flop 74 which represents one flip-flop from the plurality of flip-flops in row 6. It will be recognized that what is being represented in FIG. 6 is the shift-down logic for one position of row 6. However, the shift-down logic for the other of the multiplicity of bit positions of row 6 will be identical to that shown for flip-flop 74. Row 6 shift-down logic includes a plurality of gates 69, 71, 73, 75, one for each row to which the contents of row 6 can be shifted. The true and complement side of flip-flop 74 is connected as an input to each of said gates. Each gate is connected through suitable delaying means to the bit position of one of the subsequent four rows, corresponding to the bit position of flip-flop 74. For example, gate 75 is connected via delays 70 and 72 to flip-flop 76 of row 5 for a shift-down of one row. Likewise, gate 73 is connected through suitable delays to flip-flop 78 of row 4 for a shift-down of two rows. Gate 71 is connected through suitable delaying means to flip-flop 79 of row 3 for a shift-down of three rows and gate 69 is connected through suitable delaying means to flip-flop 80 of row 2 for a shift-down of four rows. Lines 50, 52, 54, 64 from buffer shift designation logic 144 are connected as enabling lines to row 6 shift-down logic. Line 50 is connected to gate 75 to enable a shift-down of one row. Line 52 is connected to gate 73 to enable a shift-down of two rows. Line 54 is connected to gate 71 to enable a shift-down of three rows. Line 64 is connected to gate 69 to enable a shift-down of four rows. Since shifting, as will subsequently be explained, occurs concurrently in all rows during A-time, the illustrated delay means are necessary to make certain that the instruction of a subsequent row, which may have to be shifted out of that row into a yet more subsequent row, has time to be shifted out before the instruction from row 6 is shifted downwardly. For example, it may be that all rows in a given situation are to be shifted downwardly one row. Therefore, line 50 of FIG. 6 would be activated to shift the value of flip-flop 74 via gate 75 and delays 70, 72 into the corresponding flip-flop 76 of row 5. However, row 5 was also to be shifted down one row, as postulated. Therefore, to prevent race conditions which may result in the unintended obliterating of the instruction in row 5, delays 70, 72 are included to allow time for the instruction in row 5 to shift into row 4 before the instruction from row 6 is shifted into row 5. Likewise, suitable delaying means are provided in FIG. 6 for shifts downwardly of two, three and four rows. The time value of the delay is dependent upon the system shift time and can be supplied according to the designer's choice. Hence, for a shift-down of one row for row 6, line 50 would be activated to gate the contents of flip-flop 74 via gate 75 into flip-flop 76, after the suitable delay provided by 70 and 72. A shift-down of two, three or four rows is analogously provided by activation of one of lines 52, 54, 64.

OPERATION

The description of the operation of the apparatus of our invention will be explained with reference to the machine cycle thereof. Several examples of skipping will be given.

GENERAL OPERATION

With reference to FIG. 1, there is seen a typical machine cycle for the apparatus of our invention. The machine cycle of FIG. 1 is broken up into five times designated A-time, B-time, C-time, D-time, and E-time. Before discussing the machine cycle in detail, a general summary of operation will be given.

In the operation of the digital computer, a programmer often desires to have certain predetermined instructions processed upon the unsuccessful resolution of a machine test and to have these predetermined instructions skipped upon the successful resolution of a machine test. Previous to our invention, this has been done by the well-known branch instruction with the necessity of processing a branch point exit, which is wasteful of time. By using the apparatus of our invention, it becomes possible to skip these predetermined instructions directly without the processing of a branch exit. This situation is signified in code, according to our invention, by flagging the instructions desired to be skipped and including them between two skip instructions. This is seen in FIG. 9A. It will be recalled that an instruction used in the apparatus of the present invention contains at least a skip flag, an operation code, an *I*-field and a *j*-field. The skip flag, if set to a one, indicates that the instruction is to be skipped upon the successful determination of the machine condition. The machine condition is a function of two bits, one designated by the *i*-field, the other designated by the *j*-field. The Op code of the instruction designates whether it is a skip instruction, and if it is a skip instruction, it indicates the function of the two bits signified by the *i*- and *j*-fields upon which the condition determination is to be made. In general, all instructions with their skip flag bit on, and located between two successive skip instructions, each said skip instruction not having its own skip flag set to one, are candidates to be skipped. These will be skipped only if the apparatus is in the skip mode, indicated by SKST 124 being in its one state. The scope of the skip is defined as all instructions between the two successive skip instructions not having their skip flag set to one, and all instructions within the scope of the skip and having their skip flags set to one, are to be skipped. This can be seen in FIG. 9A. This FIG. is indicative of a part of a sequence of code. All instructions preceded by an asterisk indicate that the skip flag bit for that instruction is set to a one. In FIG. 9A, there are two successive skip instructions, each not having its skip flag on. Thus, the skip scope includes all five instructions between the two skip instructions. If the function of the two bits indicated in the first skip instruction is successful (i.e. calculated as true) then the instructions with their skip flag bit on within the skip scope are to be skipped. In this case OP 2, OP 3, OP 4, are to be skipped upon successful determination of the function of the two bits as indicated in the first skip instruction. If the function of the two bits is calculated as false, then OP 2, OP 3, OP 4 are processed in sequence. In any event, OP 1 and OP 5 are processed. If the first skip instruction is determined to be successful then the apparatus is said to be in the skipping mode and all starred instructions within the skip scope are skipped. Upon reaching the next skip instruction, a new condition determination is made for subsequent starred instructions following the second skip instruction.

A broad description of the operation can be given with reference to FIGS. 2 and 3. The activation of line 157 of FIG. 3 is an indication indicative of the fact that the apparatus is in the skipping mode. Assuming, for the moment, that the apparatus is not in the skipping mode, each instruction in a sequence is entered at successive B-times into row 6 of the shift-down device 1 of FIG. 2 and shifted down one row once each cycle. Ultimately each instruction will reach row 0 where, at D-time of the cycle in which it was shifted into row 0, its OP code will be gated via gate 118 over bus 171 to instruction decoder 40. If the instruction is not a skip instruction it will be decoded and according to its identity, one of the lines extending leftwardly from the instruction decoder 40 will be energized to activate the proper facility of the computer to perform the function indicated by the instruction. Likewise at D-time, the *i*-field and *j*-field are gated from the row 0 via gates 120, 122 to auxiliary decoders 44 and 46 in order to select two bits of the condition register. If the instruction is a skip instruction, one of the eight lines labeled 42 proceeding from the instruction decoder to the function generator will be energized. The two bits of the condition register designated by the *i*- and *j*-fields will also be transmitted to the function generator. If the function of the two bits is false, the skip is said to be unsuccessful and line 67 sets the skip state flip-flop to a zero. If the function of the two bits is true, the skip is said to be successful and line 65 will turn the skip state flip-flop 124 to its one state thus providing an output on line 157 indicating that the apparatus is in its skip mode.

As mentioned above, No-Op logic 145, 147, 149 are, for the present example, well-known AND gates. Upon the determination that the apparatus is in the skipping mode, and that the skip flag bit of any of rows 1, 2, 3 is on, then the No-Op logic will, via lines 146, 148, 150 set the No-Op bit to one in each row which has its skip flag bit set to 1. The true and complement values of each No-Op bit in rows 1, 2 and 3 are sent via lines 250, 252, ..., 260 to gate 142 where they are gated via line 274, 275, ..., 279 to buffer shift designation logic 144.

As previously explained, buffer shift designation logic 114 activates via bus 264, the shift logic for each row in the buffer to make certain that each row with its No-Op bit set equal to one, indicative that the instruction therein is to be skipped, is not shifted downward and that an instruction is shifted downward into said row with its No-Op bit set equal to one, thereby electronically writing over the instruction which is to be skipped. Thereafter, lines 82, 84, 86, 88 order instructions from the source of the instruction sequence to fill vacancies in the rows of the shift-down device 1 vacated by the previous shift-down.

Specific Examples of Operation

Specific examples will now be given with the aid of a detailed description of the machine cycle of FIG. 1. In FIG. 1, it can be seen that at A-time, each row of the buffer which is to be shifted down is shifted. At B-time new instructions from the source of the sequence of instructions are entered into the rows of the buffer which were vacated at the previous A-time. Also at B-time, the No-Op bit of each of rows 3, 4, 5 and 6 which have a new instruction entered therein is set to zero and the Op code of the instruction is predecoded and the $S_f$ bits set to one if the instruction is a skip and to zero if the instruction is not a skip. At C-time of the cycle, if the apparatus is in a skipping mode from a previous cycle, the No-Op bits of rows 1, 2, and 3 are set to one if the skip flag of that row is a one and also if the particular row is not preceded by the second successive nonflagged skip instruction in the sequence. It will be noted that these No-Op bits are set at C-time but that the skip mode, as designated by the skip state flip-flop 124, has been determined during D-time on a previous machine cycle. At D-time, the instruction is decoded and if it is a skip, the skip state flip-flop is set to indicate that the apparatus is either in the skip mode or the nonskip mode, depending upon the determination of the function of the two bits of the condition register indicated by the *i*-field and *j*-field. Also at this time, the flip-flops in the buffer shift designation logic all are set to zero to deactivate all lines of bus 264 inasmuch as shifting has already taken place at A-time. At E-time, the flip-flops in the buffer shift designation logic are set under control of the value of the No-Op bits in rows 1, 2 and 3 of the buffer in order to activate the proper shifting lines of bus 264. At A-time of the next cycle, the activated lines of bus 264 are gated to the shift-down logic of each row to effect shift-down of each row in the buffer according to the setting of the flip-flops in the buffer shift designation logic.

Several examples of the operation of the apparatus of our invention will now be given. Referring to FIG. 10A, there is seen a sequence of instructions such as might be written by a computer programmer. In all, 14 instructions are seen including first and second unflagged skip instructions, designated SKIP 1 and SKIP 2, which define a skip scope. An asterisk before an instruction indicates that that instruction is flagged for skipping. Therefore, OP 3, OP 4, and OP 5, within the skip scope between SKIP 1 and SKIP 2, are to be skipped if the function of the two bits of the condition register, as designated by the *i*- and *j*-fields of SKIP 1, is true. Likewise, if SKIP 2 is successful, OP 8 and any other flagged instructions between SKIP 2 and a subsequent skip instruction (not shown) will be skipped. Assuming all rows of shift-down device 1 are vacant as an initial condition, and that all flip-flops in the buffer shift designation logic 144 are initially set to zero, then at E-time of the first cycle, the value of the No-Op bits of rows 1, 2 and 3 will be gated via gate 142 to buffer shift designation logic 144, seen in detail in FIG. 5. Since the value of each No-Op bit is zero inasmuch as we have assumed the buffer is initially vacant, AND gate 152 will be activated to turn flip-flop 140 to its one state to thereby activate lines 16, 18, 22, 27, 34 and 50 to indicate to the shift-down logic that the contents of row 1 through row 6 are to be shifted down one row at A-time of the second cycle. Since the contents of all rows are initially zero, also assumed, all zeros will be shifted down one row at this A-time. Also, since the true side of the flip-flop 140 activated line 82, the source of the sequence of instructions will be notified to transmit one instruction, OP 1 of our present example, over bus 90. At B-time, line 107 will activate gate 106 and line 82 will cause OR gate 97 to be activated over line 3 thereby enabling gate 98 to gate OP 1 to bus 125 and thereby into row 6 which was vacated at A-time. The Op code of the instruction will also be gated over bus 117 to predecoder 108. The instruction is predecoded to be not a skip, and the $S_f$ bit in row 6 will be set to a zero. At C-time of the second cycle, line 151 will enable gate 116 to transmit the state of lines 146, 148, 150 to set the No-Op bits in rows 1, 2 and 3. However, since there have been all zeros in the buffers so far, the instruction decoder 40 will not have decoded a skip instruction (assuming for this example that a skip instruction is not an all zero configuration) and hence the skip state flip-flop 124 will be in a zero condition resulting in nonactivation of line 157. Since line 157 enables all of the No-Op logic circuitry, none of the lines 146, 148, 150 will be activated and the No-Op bits of rows 1, 2 and 3 remain in a zero state. At D-time of the second cycle, the Op Code of the instruction just shifted from row 1 to row 0 will be gated via gate 118 to the instruction decoder. The configuration is still all zeros, as assumed, and so none of the lines 42 will be activated to compute any function of any bits of the condition register. Hence, the skip state flip-flop 124 will remain in the zero condition. At E-time of the second cycle, the flip-flops in the buffer shift designation logic will be set under control of the value of the No-Op bits, which have just been set at C-time via gate 116. Since these are again all zeros, according to the present example, AND circuit 152 of FIG. 5 will again be activated, and again, at A-time of the third cycle, lines 16, 18, 22, 27, 34, and 50 will be activated to shift each row down one. Likewise, line 82 will again be activated to order one more instruction for the buffer, this instruction being the SKIP 1 instruction of our example in FIG. 10A. This action continues, shifting each instruction down and ordering one more instruction until such time as the SKIP 1 instruction is shifted down into row 0, which will occur at A-time of the ninth cycle, according to our present example. At this time, the instructions in rows 0 through 5 are as seen in FIG. 10B, which is a subset of FIG. 10A. Row 6 is vacant because the instruction OP 6, has just been shifted at A-time from row 6 into row 5. At this time, line 82, which was activated during E-time of the previous cycle, (since all No-Op bits are necessarily 0 in rows 1, 2 and 3 inasmuch as there has been no previous skip instruction which could have activated line 157) orders another single instruction, which is SKIP 2 and causes it to be gated at B-time into row 6 of the buffer. This instruction is also predecoded as explained for other instructions previously. At C-time of this ninth cycle, the No-Op bits of rows 1, 2 and 3 are to be set under control of the No-Op logic circuitry. However, these will be set to zero again since line 157 is not yet activated. It is to be noted that even though a skip instruction (namely SKIP 1) is now in row 0, it does not get decoded until D-time of the cycle in which it is shifted into row 0, whereas the No-Op bits are set at C-time and are therefore dependent upon the condition of line 157 which reflects the instruction in row 0 during the previous cycle (eighth). At D-time of the present cycle (ninth), line 176 gates the Op code of SKIP 1 from row 0 into instruction decoder 40 and gates the *i*- and *j*-fields into the decoders 44 and 46. Referring to FIG. 7, it can be assumed for this cycle that the skip instruction is decoded to be an instruction which indicates that a skip is to be taken upon the successful calculation of the AND function of the bits $C_i$ and $C_j$ designated by the *i*- and *j*-fields, respectively. Therefore, line 263 of FIG. 7 will be activated. Bit $C_i$ and $C_j$ will be transmitted to gate 215. Gate 215 will be enabled by line 263 to send the values of bits $C_i$ and $C_j$ to AND gate 226.

Assuming both $C_i$ and $C_j$ to be true for this example, line 228 in FIG. 7 will be activated which will activate line 65 (the successful condition determination line) via OR gate 247 to set skip state flip-flop 124 to its one state and therefore activate line 157 of FIG. 3. This all occurs during D-time of cycle nine. Also during D-time, the flip-flops in buffer shift designation logic 144 are reset to zero in anticipation of their being set at the coming E-time. At E-time of cycle nine, the No-Op bits of rows 1, 2 and 3 are gated to buffer shift designation logic 144. These No-Op bits were set at C-time of the present cycle, and therefore were set to zero inasmuch as line 157 of FIG. 3 was not activated until D-time of the present cycle. Therefore buffer shift designation logic will again indicate that all rows are to be shifted down one row at the next A-time (cycle 10) and that one more instruction will be gated to the then vacated row 6. Proceeding to this A-time, all rows in the buffer are shifted down one. At B-time of cycle 10, a new instruction is gated into row 6. This new instruction is OP 7. The contents of the rows is now as seen in FIG. 10C. In that FIG., instruction OP 2 has been shifted from row 1 to row 0. Likewise, all other instructions have been shifted down one row. As can be seen, OP 3, OP 4, and OP 5 are in rows 1, 2 and 3, respectively. Now at C-time, the No-Op bits of rows 1, 2 and 3 are to be set under control of the No-Op circuitry 145, 147, 149. Since at the previous D-time (cycle nine), line 157 was activated, and since the instructions in rows 1, 2 and 3 are flagged and since the $S_i$ bits of rows 0, 1, and 2 are zero, (which indicate that there are no skip instructions between the flagged instructions in row 1, 2 and 3 and the previous skip instruction which was just shifted out of row 0) then lines 146, 148, 150 would be activated at C-time to set the No-Op bits of rows 1, 2 and 3 to a one state. This is seen in FIG. 10C by the inclusion of the letters N-O after the instructions in row 1, 2 and 3 indicating that at C-time of this 10th cycle, their No-Op bits are set to a one. At D-time of this cycle, the instruction in row 0, which is OP 2, is decoded. Since it is not a skip instruction, it will have no effect on skip state flip-flop 124 and line 157 will remain activated. Also at D-time, the flip-flops in buffer shift designation logic 144 are reset to zero. At E-time of this cycle, the flip-flops in buffer shift designation logic 144 will be set according to the value of the No-Op bits of rows 1, 2 and 3 which have just been set to one, indicating that each instruction in each of those rows are to be skipped. These bits are gated via gate 142. This has the following result. Referring to FIG. 5, it is seen that since all No-Op bits are equal to one, the output of AND gate 166 will be active. This will set flip-flop 126 to its 1 state. Referring also to FIG. 4, col. 8, it is noted that when the No-Op bits of rows 1, 2 and 3 are each one, then the skip of the instructions in each of those rows is effected by shifting down each of rows 4, 5 and 6 four spaces. This means that the instruction in row 4 will be shifted into row 0 to be processed on the next cycle. The instruction in row 5 will be shifted into row 1, thus obliterating the instruction in row 1, which was to be skipped. The instruction in row 6 is shifted four rows into row 2 thus obliterating the instruction in row 2 which was to be skipped and, finally, four new instructions are gated into rows 3, 4, 5 and 6 of the buffer, the instruction being gated into row 3 obliterating the instruction in that row which was to be skipped. Thus, it is clear how instructions are skipped by electronically overwriting. This is seen in detail in FIG. 5. The true side of flip-flop 126 causes the activation of lines 32, 48 and 64 which respectively indicate that rows 4, 5 and 6 are to be shifted four rows at the next A-time. Also, line 88 is activated which, referring to FIG. 2, is sent back to the source of the sequence of instructions to order four new instructions. At A-time of the next cycle (cycle 11), lines 32, 48 and 64 are gated to shift rows 4, 5 and 6 down four rows each as explained above, line 88 indicates to the source of the sequence of instructions to send four new instructions, and at B-time, lines 9, 15, 19 and 21 effect the enabling of gates 98, 100, 102 and 104 to gate the four new instructions into rows 3, 4, 5 and 6 of the buffer as explained in the previous reference to FIG. 4. The instructions in the buffer are now as indicated in FIG. 10D. It will be noted OP 8, which is a candidate to be skipped and therefore has its skip flag bit set to a one, is now in row 3. At C-time of cycle 11, the No-Op bits of rows 1, 2 and 3 will be set according to the condition of lines 146, 148, 150, which are the output lines of the No-Op logic 145, 147, 149. At this present C-time, line 157 will be activated as an input to the No-Op logic circuits. Also, the skip flag of row 3 will be activated as an enabling input to row 3 No-Op logic 149. However, it is to be noted that unflagged instruction SKIP 2 is in row 1. This skip instruction precedes the instruction in row 3 which is to be skipped, and also is subsequent to the instruction SKIP 1 which caused line 157 to be activated. However, according to the ground rules of the apparatus, OP 8 is in the skip scope of SKIP 2 and its skipping therefore depends upon the successful determination of the machine condition indicated by SKIP 2, and does not depend on the successful machine condition indicated by SKIP 1 which activated line 157. Therefore, bit $S_i$ in row 1, which is an enabling line to row 3 No-Op logic via line 187 is not active, since the $S_i$ bit had been set to a one previously by the predecoders associated with the row into which the instruction SKIP 2 was originally entered. Hence, line 150, as well as lines 146 and 148, will not be active and the No-Op bits of rows 1, 2 and 3 will remain set to zero. Thus, at the next A-time (of cycle 12, all instructions will be shifted down one row and SKIP 2 will be in row 0. A new instruction is entered in row 6 at B-time. The contents of the buffers are as shown in FIG. 10E. If the machine condition indicated by SKIP 2 is successful, skip state flip-flop 124 will, at the D-time of cycle 12,receive a signal over line 65 by virtue of which line 157 will remain active. OP 8 will be skipped two cycles later in a manner similar to that explained for OP 3, OP 4, and OP 5 of the present example. The above example is also seen graphically in FIG. 10F with each OP replaced by its number and each SKIP designated as S. The above example was given in step-by-step fashion assuming the shift-down device 1 was initially empty. It will of course be recognized by those skilled in the art that means can be provided to detect an all zero Op Code in rows 0, 1 and 2 to initiate the entering of four instructions, one each into rows 3, 4, 5 and 6, to give fast startup capability. This would result in a situation such as Col. 8 of FIG. 4 such that SKIP 1 would have reached row 0 in the second cycle rather than the ninth for the above example.

A second example will now be given to illustrate a singular situation in which skipping is performed by inhibiting the decoding of any instruction in row 0 rather than by writing over the instruction. This singular situation occurs when an instruction which is to be skipped is shifted into row 0 after its preceding skip instruction has been found to indicate a machine condition which is successfully determined. This singular situation can occur in two ways. The first way is that the instruction which is to be skipped is the next instruction immediately following a successful skip instruction. This can be seen by the fact that in this situation, the skip instruction will be in row 0 when the instruction to be skipped as in row 1.

Since the No-Op bits of row 1 (as well as rows 2 and 3) are set at Cotime and the instruction in row 0 (the skip instruction in this example) is not decoded until D-time, it will be impossible, in the present embodiment of our invention, to set the No-Op bit of row 1 under control of the decoding and condition resolution of the skip instruction in row 0. The second way this singular situation can occur is when the instruction in row 4 happens to be an instruction to be skipped (skip flag on) in a situation where row 4 is to be shifted downwardly four rows into row 0 (corresponding to Col. 8 of FIG. 4). In this case, a flagged instruction again gets into row 0 without passing into rows 1, 2 or 3. Hence, the No-Op bit for that instruction is not set to one.

At this point the AND gate 165 comes into play. The situation is seen relative to FIG. 11A. In that FIG., a string of code is seen, as might be written by the programmer. Instruction OP 2 and OP 3 are to be skipped dependent upon the successful determination of the machine condition indicated by SKIP 1.

Since the previous example has given the details of how the logic of the present embodiment of our invention operates, the present example will not bother with the details but will explain functionally what occurs. Assume that the instruction SKIP 1 has just been shifted into row 0 at A-time of cycle 1 of this example. Row 6 is therefore vacated and at B-time one new instruction will be gated into row 6 and will be predecoded and the $S_t$ bit will be appropriately set. The No-Op bit, as usual, will be set to zero. The contents of each row of the shift-down buffer are now as seen in FIG. 11B. At C-time of the first cycle of this example, gate 116 will be enabled to set the No-Op bits of rows 1, 2 and 3. It is assumed that initially the shift-down buffer contents were all zero. At C-time of this first machine cycle of the present example, all No-Op bits will remain zeros in rows 1, 2 and 3. At D-time, the instruction SKIP 1 will be decoded in instruction decoder 40. The appropriate bits from the condition register will be gated to the function generator after having been decoded from decoders 44 and 46. Since the instruction is a skip instruction, one of the lines 42 will be activated. Assuming that the computed function of the two bits of the condition register is successful, line 65 from function generator 62 will set skip state flip-flop 124 to its 1 state thus activating line 157. At this time also, the flip-flops in buffer shift designation logic 144 will be reset to zero. At E-time, the No-Op bits will be gated to buffer shift designation logic. Since all the bits are zero, as previously explained, then at A-time of the second cycle, the appropriate lines from bus 264 will shift each instruction down one row in the buffer. At B-time of the second cycle, a new instruction will be gated into row 6 since this row is now vacant. At the end of B-time, the shift-down buffer will have contents as seen in FIG. 11C. It will be noted that the No-Op bit of row 2 and also of row 3 were not set at C-time of cycle one, since the SKIP 1 instruction was not decoded and determined successful until D-time of the first cycle. Therefore OP 2, which is to be skipped, has been shifted down into row 0 and cannot be skipped by being electronically overwritten. At C-time, gate 116 is enabled to set the No-Op bits in rows 1, 2 and 3. Since OP 3 is in row 1 and is to be skipped, its skip flag is set to one and line 183 to row 1 No-Op logic is activated. Likewise line 187 is activated. Further, since the instruction presently in row 0 is not a skip instruction, line 189 is activated. The result is that line 146 sets the No-Op bit in row 1 to a one. At D-time, gate 118 is energized in an attempt to decode and hence process the instruction in row 0. However, this instruction was to be skipped. Therefore, its skip flag bit is on so that line 161 is energized. Likewise since the previously processed instruction was a successful skip, line 159 is energized. Therefore, line 167 from AND gate 165 acts as an inhibit to instruction decoder 40 at D-time and no instruction is processed and thereby the instruction in row 0 is skipped. At E-time of this, the second cycle of our present example, the value of the No-Op bits of rows 1, 2 and 3 are gated to buffer shift designation logic 144. The No-Op bit of row 1 is a one and the No-Op bits of rows 2 and 3 are zero. Therefore, and corresponding to column 2 of FIG. 4, rows 2 through 6 are shifted down two rows at A-time of the third cycle of our example with the result that the instruction in row 1 is electronically written over and thereby skipped. The contents of the shift-down buffer 1 are as seen in FIG. 11D. On the next, that is the fourth, cycle of our example, instruction SKIP 2 will be shifted into row 0 where it will be decoded. If it is successful then instruction OP 8 will be skipped on one of the subsequent cycles. If it is unsuccessful, line 157 will be deactivated as a result of the action of function generator 62 and the skipping of instruction OP 8 will be inhibited. This example is seen in summary in FIG. 11E.

A final example is seen in FIGS. 12A and 12B. In FIG. 12A a sequence of code including a first skip instruction, SKIP 1, is seen. The second skip in the sequence can be assumed to follow in the sequence but is not shown. As seen in FIG. 12B, we take up the example with SKIP 1 already in row 0. The function determination is assumed successful. On cycle 1, the contents of each row moves downward one row for the same reason as in the next previous example. The No-Op bits of rows 1, 2 and 3 are set at C-time of cycle 1. At D-time OP 1 is skipped by the action of inhibit line 167. At A-time of cycle 2 rows 4, 5 and 6 each shift down four rows (Col. 8, FIG. 4) and OP 2 OP 3 and OP 4 will be skipped by overwriting. The No-Op bit of OP 5, which is now in row 0, is not set since OP 5 never passed through rows 1, 2 or 3 but was rather shifted directly into row 0 from row 4. Therefore OP 5 is skipped at D-time of cycle 2, also due to the action of inhibit line 167. OP 6 will be skipped by overwriting at A-time of cycle 3.

It is also evident from the apparatus of our invention that a skip instruction can itself be skipped, should the programmer so desire. This is evident from the fact that the skip flag of a skip instruction which itself is to be skipped will be set to a one and will be effective to cause the skipping of that skip instruction just as is the skip flag bit of any other type of instruction.

While the invention has been particularly shown and described with reference to a preferred embodiment thereof, it will be understood by those skilled in the art that various changes in form and details may be made therein without departing from the spirit and scope of the invention.

We claim:

1. In a multi-instruction processing machine, the combination of:

means for storing a sequence of instructions;

decoding means responsive to a specific type of instruction in said sequence of instructions, for indicating that explicitly predetermined subsequent instructions in said sequence are to be skipped on the occurrence of a specified condition;

means for detecting the occurrence of said specified condition; and means responsive to said detection of said occurrence for skipping said explicitly predetermined instructions.

2. Apparatus in a digital computer for effecting the skipping of certain predetermined instructions in a sequence of instructions and for inhibiting the skipping of certain other predetermined instructions in said sequence of instructions, wherein each instruction includes a code portion designating the instruction type, and first and second portions which, for a specific type of instruction, designate machine parameters upon which a condition determination is to be made, and each instruction further includes a skip flag connoting that said instruction is to be skipped upon a previous successful condition determination, comprising in combination:

a source of said instructions;

a first plurality of storage means for receiving at least a portion of said instruction sequence from said source;

a second plurality of storage means;

third storage means;

means for transferring said instructions from ones of said first plurality of storage means to other ones of said first plurality of storage means and to ones of said second plurality of storage means, said transferring means also capable of transfering instructions from ones of said second plurality of storage means to other ones of said second plurality of storage means;

means for decoding said code portion of said instructions from a specific one of said second plurality of storage means and providing signals to said computer for processing said decoded instructions, and providing other signals upon the decoding of one of said specific type of instructions, said other signals indicative of said condition determination to be made;

decoding means for decoding said first and second portions of said instruction from said specific one of said second plurality of storage means and providing a signal to said third storage means defining the machine parameters upon which said condition determination is to be made, said third storage means providing outputs representative of said condition parameters;

function generation means responsive to said other signals and to said output of said third storage means for providing a first indication indicative of the detection of said specific type instruction and of a successful condition determination, and for providing a second indication indicative of the detection of one of said specified instruction and the lack of a successful condition determination;

logic means responsive to said first indication and said skip flag in said specific one of said second storage means for skipping said instruction in said specific row by inhibiting the decode of said instruction;

second logic means responsive to said first indication and to the skip flags of specified ones of said first and second storage means for setting a predetermined bit in the instructions of said specified ones of said first and second storage means containing instructions to be skipped; and logic responsive to said specific set bits and providing an output for shifting instructions in said sequence into said specified instructions in said sequence into said specified ones of said first and second storage means containing instructions to be skipped.

3. In a multi-instruction processing machine where instructions are issued in sequence and decoded for processing, means for skipping a subset of a predetermined set of instructions, comprising in combination:

means for decoding instructions, certain of which indicate a condition upon which said subset of instructions are to be skipped;

means for providing an indication of the occurrence of said condition;

means responsive to said indication for marking ones of said subset of instructions to be skipped; and means responsive to said markings in subset of instructions for skipping said subset of instructions.

4. The combination of claim 3 further including means responsive to said indication for inhibiting the decoding of other ones of said certain instructions to be skipped.

5. In a data processing machine the combination of:

a source of a sequence of instructions, each instruction containing a skip indicator settable to either of two stable states, said sequence of instructions containing skip instructions indicating that subsequent instructions before a succeeding skip instruction and with their skip indicators set to one of said two stable states are to be skipped in said sequence upon the detection of a predetermined machine condition;

decoding means responsive to said skip instructions for indicating the predetermined machine condition to be detected;

detection means for detecting said predetermined machine condition; and skipping means responsive to the detection of said predetermined machine condition for affecting the skipping of said instructions.

6. In a multi-instruction processing machine, the combination of:

storage means for temporarily storing a sequence of instructions from a memory, said instructions including skip instructions;

first decoding means responsive to said skip instructions for generating an indication of at least one of said machine conditions to be detected;

second decoding means for generating parameters of said at least one of said machine conditions;

means responsive to said indication and to said generated parameters for detecting the occurrence of said at least one machine condition; and means responsive to said detecting means and coupled to said storage means for skipping explicitly predetermined instructions in said sequence by overwriting said instructions by other instructions.

7. In a multi-instruction processing machine wherein instructions are issued in sequence and decoded for processing, the combination of:

shift-down buffer means for receiving at least a part of a sequence of instructions;

first decoding means responsive to specific ones of said sequence of instructions, for indicating that explicitly predetermined instructions in said sequence are to be skipped upon the occurrence of a machine condition;

second decoding means for determining parameters of said condition;

storage means responsive to said second decoding means for providing an indication of the occurrence of said parameters;

function generating means responsive to said first decoding means and to the indication of the occurrence of said parameters for providing an indication of the occurence of said condition; and means responsive to said indication of said condition for effecting the skipping of said explicitly predetermined instructions.

8. The combination of claim 7 wherein said last-named means includes means for marking ones of said explicitly predetermined instructions in said buffer means, and means responsive to said markings for shifting unmarked ones of said instructions into portions of said buffer means containing said marked instructions, thereby electronically writing over said marked instructions.

9. The combination of claim 8 wherein said last-named means further includes means responsive to said indication for inhibiting the decoding of other ones of said predetermined instructions.

PO-1050
(5/69)

UNITED STATES PATENT OFFICE
CERTIFICATE OF CORRECTION

Patent No. 3,577,190 Dated May 4, 1971

Inventor(s) John Cocke, Philip S. Dauber; Herbert Schorr, Edward H. Sussenguth

It is certified that error appears in the above-identified patent and that said Letters Patent are hereby corrected as shown below:

Col. 3, line 9, should read --IF (a)X = A x Y+B--;

In Col. 3, line 10, the equation should read --Z = X+C--;

Col. 3, line 13, should read --BRANCH If not (a)--;

Col. 3, line 16, should read --Z = Z+C--;

In Col. 3, line 34, "acondition" should read -- (a) condition--.

Signed and sealed this 12th day of October 1971.

(SEAL)
Attest:

EDWARD M.FLETCHER,JR.
Attesting Officer

ROBERT GOTTSCHALK
Acting Commissioner of Patents